(12) United States Patent
Cullen

(10) Patent No.: US 8,863,481 B2
(45) Date of Patent: Oct. 21, 2014

(54) BAG INSTALLATION FOR BAGGING MACHINE

(75) Inventor: Steven R. Cullen, Astoria, OR (US)

(73) Assignee: SRC Innovations, LLC, Chinook, WA (US)

( * ) Notice: Subject to any disclaimer, the term of this patent is extended or adjusted under 35 U.S.C. 154(b) by 303 days.

(21) Appl. No.: 12/211,028

(22) Filed: Sep. 15, 2008

(65) Prior Publication Data
US 2010/0064641 A1 Mar. 18, 2010

(51) Int. Cl.
*A01F 25/14* (2006.01)
*A01F 25/18* (2006.01)

(52) U.S. Cl.
CPC .......... *A01F 25/14* (2013.01); *A01F 2025/145* (2013.01); *A01F 25/183* (2013.01)
USPC ................. 53/527; 53/570; 141/71; 141/114; 141/313

(58) Field of Classification Search
CPC . A01F 25/14; A01F 25/183; A01F 2025/142; A01F 2025/145
USPC .......... 53/438, 439, 459, 567, 570, 576, 527; 141/71, 114, 313, 314; 100/65, 100, 100/145
See application file for complete search history.

(56) References Cited

U.S. PATENT DOCUMENTS

| | | | |
|---|---|---|---|
| RE31,810 E | | 1/1985 | Lee |
| 4,735,242 A | * | 4/1988 | St. Clair ........................ 141/114 |
| 4,945,715 A | * | 8/1990 | Brodrecht ....................... 53/567 |
| 4,949,633 A | * | 8/1990 | Johnson et al. ................. 100/65 |
| 5,213,143 A | * | 5/1993 | Policky et al. ................... 141/71 |
| 5,720,400 A | * | 2/1998 | Altizer, Sr. ..................... 212/180 |
| 5,799,472 A | * | 9/1998 | Cullen ............................ 53/567 |
| 5,899,247 A | | 5/1999 | Cullen |
| 5,904,031 A | | 5/1999 | Cullen |
| 5,960,612 A | | 10/1999 | Cullen |
| 6,009,692 A | | 1/2000 | Cullen |
| 6,050,066 A | | 4/2000 | Brodrecht |
| 6,061,999 A | | 5/2000 | Wingert |
| 6,085,807 A | * | 7/2000 | Wright .......................... 141/314 |
| 6,202,389 B1 | | 3/2001 | Inman et al. |
| 6,206,127 B1 | * | 3/2001 | Zakula et al. ................. 180/236 |
| 6,216,425 B1 | | 4/2001 | Hanten |
| 6,220,001 B1 | | 4/2001 | Brodrecht |
| 6,430,897 B1 | | 8/2002 | Cameron et al. |
| 6,443,194 B1 | | 9/2002 | Cullen |
| RE38,020 E | | 3/2003 | Cullen |
| 6,655,116 B2 | | 12/2003 | Cullen |
| 6,672,034 B1 | | 1/2004 | Wingert |
| 6,694,711 B1 | | 2/2004 | Cullen |
| 6,708,742 B2 | | 3/2004 | Weathers et al. |
| 6,748,724 B1 | | 6/2004 | Cullen |

(Continued)

FOREIGN PATENT DOCUMENTS

| | | | |
|---|---|---|---|
| DE | 4012482 A1 | 10/1991 | |
| DE | 10032824 A1 | 1/2002 | |
| EP | 1210864 A2 | 6/2002 | |
| EP | 1721517 A2 * | 11/2006 | .............. A01F 25/14 |

*Primary Examiner* — Stephen F Gerrity
(74) *Attorney, Agent, or Firm* — Brinks Gilson & Lione; Ryan L. Marshall

(57) ABSTRACT

Bag installation for bagging machines may include bag installation systems and/or methods that provide efficient, convenient, safe, and/or simplified means and/or steps for installing a bag on, and/or maintaining bag on, a bagging machine.

18 Claims, 18 Drawing Sheets

(56) References Cited

U.S. PATENT DOCUMENTS

| | | |
|---|---|---|
| 6,941,731 B1 | 9/2005 | Cullen |
| 6,955,030 B2 | 10/2005 | Cullen |
| 7,117,656 B2 | 10/2006 | Cullen |
| 7,178,315 B2 | 2/2007 | Cullen |
| 7,237,576 B1 | 7/2007 | Cullen |
| 2004/0128953 A1 | 7/2004 | Cullen |
| 2004/0144067 A1 | 7/2004 | Cullen |
| 2006/0151059 A1* | 7/2006 | Ours et al. .................... 141/314 |

* cited by examiner

BAG INSTALLATION FOR BAGGING MACHINE

RELATED APPLICATIONS

The present application relates to the following co-pending patent applications, which are commonly-assigned to SRC Innovations LLC, include the common inventor Steven Cullen, and were filed on Apr. 1, 2008: U.S. patent application Ser. No. 12/060,424, entitled "Mobile Bagging Machine"; U.S. patent application Ser. No. 12/060,461, entitled, "Mobile Bagging Machine Rotor Assembly and Transmission"; U.S. patent application Ser. No. 12/060,464, entitled "Mobile Bagging Machine Tunnel"; and U.S. patent application Ser. No. 12/060,474, entitled "Movable Feed Table and Radiators".

BACKGROUND

The present disclosure relates to bagging machine systems and methods for bagging organic and other materials such as silage, compost, grain, sawdust, dirt, sand, and other materials.

Agricultural feed bagging machines have been employed for several years to pack or bag silage or the like into elongated plastic bags. In recent years, the bagging machines have also been used to pack or bag compost material and grain into the elongated plastic bags. Two of the earliest bagging machines are disclosed in U.S. Pat. Nos. 3,687,061 and 4,046,068, the complete disclosures of which are incorporated herein by reference for all purposes. In these bagging machines, silage or the like is supplied to the forward or intake end of the bagging machine and is fed to a rotor or other compression means, which conveys the silage into a tunnel on which the bag is positioned so that the bag is filled. The bagging machine moves forward at a controlled rate leaving the packed bag behind. The packing density of the material packed in the bag is determined and controlled by a number of factors including the rate at which the bagging machine moves forward and the rate at which the silage material is packed into the bag.

Bags used in conjunction with bagging machines are often very large, long, and heavy making installation of the bags onto bag machines often awkward, difficult, and hazardous. Over the years, techniques and methods have been developed to install bags onto bag machines. For example, U.S. Pat. Nos. 5,408,810 and 5,799,472, the complete disclosures of which are incorporated herein by reference for all purposes, disclose bag retainers and bag pans for installing and holding bags installed on bagging machines. However, additional improvements in bag installation systems and methods will serve to provide more convenient, safe, and simplified systems and methods for installing bags onto bagging machines. Therefore, a need exists for systems and methods that address one or more of the issues discussed above.

SUMMARY

The present invention has been developed in response to problems and needs in the art that have not yet been fully resolved by currently available systems and methods. Thus, these developed systems and methods provide bag installation systems and methods for providing efficient, convenient, safe, and/or simplified means for installing a bag on, and/or maintaining bag on, a bagging machine.

A bag installation and/or deployment system may include a support structure, a movable frame secured to the support structure, at least one bag attachment retractably connected to the movable frame, and/or an inferior bag support structure. A method of installing a bag on a bagging machine may include securing at least one bag attachment to the bag, retracting the at least one bag attachment toward a movable frame, securing a portion of the bag to an inferior bag support structure, and/or moving the movable frame upon a bag installation support structure.

These and other features and advantages of the present disclosure may be incorporated into certain embodiments of the invention and will become more fully apparent from the following description and appended claims, or may be learned by the practice of the principles in this disclosure as set forth hereinafter. The claimed invention does not require that all the advantageous features and all the advantages described herein be incorporated into every embodiment of the claimed invention.

BRIEF DESCRIPTION OF THE SEVERAL VIEWS OF THE DRAWINGS

In order that the manner in which the above-recited and other features and advantages of the invention are obtained will be readily understood, a more particular description will be rendered by reference to specific examples of embodiments thereof which are illustrated in the appended drawings. These drawings depict only typical examples of embodiments of the invention and are not therefore to be considered to limit the scope of the claimed invention.

DETAILED DESCRIPTION

Figure 1:
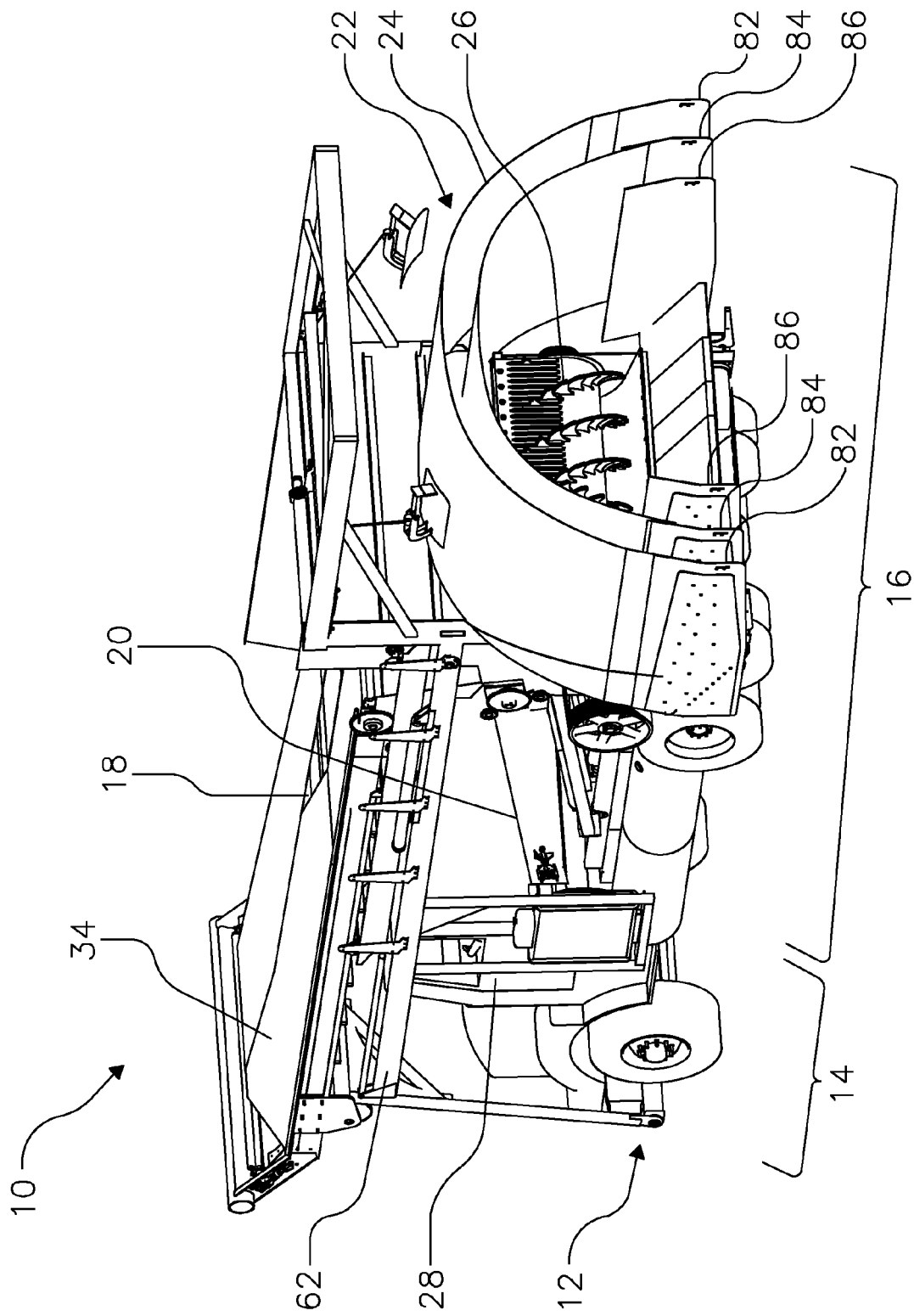
FIG. 1 is a perspective view of the side and rear portions of a bagging machine with a conveyor in a first position.

The presently preferred embodiments of the present disclosure will be best understood by reference to the drawings, wherein like reference numbers indicate identical or functionally similar elements. It will be readily understood that the components of the present disclosure, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the claimed invention.

Referring now to FIGS. 1 through 4 simultaneously, an example of a bagging machine is identified generally with the numeral 10. Bagging machine 10 is intended to bag organic and other material such as silage, grain, sawdust, compost, garbage, or sand within a bag. Bagging machine 10 may be configured for use with a conventional pre-folded bag, a bag that is folded as it is installed on the bagging machine such as described in U.S. patent application Ser. No. 10/350,973, filed Jan. 23, 2003, entitled "Material Bagging Machine Having a Bag Folder Mounted Thereon," or a bag that is formed from a roll of plastic material disposed on the bagging machine such as described in U.S. patent application Ser. No. 10/334,484, filed Dec. 30, 2002, entitled "A Method and Means for Bagging Organic and Other Material." The entire disclosures of the above-mentioned patent applications are incorporated herein by reference for all purposes.

Machine 10 may include a mobile frame 12, such as a chassis. Mobile frame 12 may include wheels to facilitate movement and control. In some embodiments, the wheels may be omitted. Additionally, bagging machine 10 and associated frame 12 may be truck-mounted, such as seen in U.S. Pat. No. 5,784,865, or may be self-propelled, such as illustrated in U.S. Pat. No. 5,799,472. The complete disclosures of both of these patents are incorporated herein by reference for all purposes.

For purposes of description, bagging machine 10 will be described as having a front or forward portion or end 14 and a rear or rearward portion or end 16. Machine 10 is provided with one or more material receiving assemblies or conveyors 18 at its forward end and one or more material receiving assemblies or conveyors 20 between the forward end and the rearward end. Conveyors 18 and 20 may be in the form of: (1) a feed table such as seen in U.S. Pat. No. 5,297,377; (2) a hopper such as seen in U.S. Pat. No. 5,398,736; (3) a feed mechanism such as shown in U.S. Pat. No. 5,396,753; (4) a feed mechanism such as shown in U.S. Pat. No. 5,367,860; or (5) a hopper such as seen in U.S. Pat. Nos. 5,140,802; 5,419, 102; and 5,724,793. The complete disclosures of the above-mentioned patents are incorporated herein by reference for all purposes.

Material receiving assemblies 18 and 20 are configured to receive the material to be bagged and to deliver the same to a material packing assembly 22, which may be positioned at the forward end or portion of a tunnel 24. Material packing assembly 22 may be: (1) a rotor such as shown in U.S. Pat. Nos. 5,396,753; 5,297,377; 5,799,472; 5,295,554; (2) a screw conveyor such as seen in U.S. Pat. Nos. 5,140,802 or 5,419, 102; (3) a plunger as seen in U.S. Pat. No. 5,724,793; or (4) the packing fingers described in U.S. Pat. No. 3,687,061. The complete disclosures of the above-mentioned patents are incorporated herein by reference for all purposes.

While not required, bagging machines 10 of the present disclosure may also include a density control assembly. A density control assembly as used herein refers to structures or devices that are coupled to the bagging machine and used to control or adjust the packing density of the material being packed into the bag. A variety of density control assemblies and methods may be implemented with the bagging machine of the present disclosure some examples of which include backstop control systems, internal control systems, and drag resistance control systems.

In early bagging machines, a backstop structure yieldably engaged the closed end of the agricultural bag to resist the movement of the bagging machine away from the filled end of the agricultural bag as silage is forced into the bag. These machines included a pair of drums rotatably mounted on the bagging machine with a brake associated therewith for braking or resisting the rotation of the drum with a selected brake force. A cable is wrapped around the drum and is connected to the backstop. Examples of such bagging machines are disclosed in U.S. Pat. Nos. 3,687,061 and 4,046,068, previously incorporated by reference.

In more recent bagging machines, an internal density control assembly including one or more cables was positioned in the flow of the agricultural material being bagged. In order to vary the packing density of the material in the machine, more or less cables would be employed based on the material being packed. In other embodiments, a single cable is employed in an arched configuration and the width of the arch is varied to vary the packing density. In still other embodiments, one or more cables are used with an anchor attached to the rearward ends thereof with the anchor being adjustable and/or the length of the cable being adjustable to control the packing density. Examples of these and other alternative configurations are disclosed in U.S. Pat. Nos. 5,297,377; 5,425,220; 5,463,849; 5,464,049; 5,517,806; 5,671,594; 5,775,069; 5,671,594; 5,857,313; 6,443,194; 6,655,116; 6,694,711; and RE38,020, the complete disclosures of which are hereby incorporated by reference for all purposes.

More recently, drag resistance density control assemblies have been developed using belts or straps disposed between the bagged material and the ground. In these embodiments, a drag member, such as one or more belts or straps, is attached to the bagging machine or the tunnel and extends rearwardly behind the tunnel. The drag member is positioned between the bagged material and the ground and may be disposed inside the bag or outside the bag. The weight of the bagged material on the drag member slows the advance of the bagging machine and increases the packing density of the agricultural material in the bag. The packing density of the material in the bag may be established prior to beginning the bagging operation or may be adjusted as the bag is being filled. The packing density is established or adjusted, at least in part, by controlling the amount of drag member surface area disposed under the weight of the bagged material. Density control assemblies for agricultural bagging machines that include drag members are disclosed in U.S. Pat. No. 6,748, 724 and U.S. patent application Ser. No. 10/867,593. The complete disclosures of the above-identified patent and patent application are hereby incorporated by reference for all purposes.

Tunnel 24 may be semi-circular, as shown in FIG. 1, or it may be square, rectangular, circular, oblong, or other such configurations. Tunnel 24 may be open at the bottom, as shown in FIG. 1, or may be at least partially closed at the bottom, as will be discussed below. As used herein, the term "tunnel" should be understood to signify a horizontal passageway open at both the forward end or portion thereof and the rearward end or portion thereof. The size of the tunnel, measured by either longitudinal length or cross-sectional area, at any particular time may be dependent on a number of factors including the diameter of the bag being filled, the type of material being bagged, the configuration of the tunnel such as semi-circular or circular, and whether bagging machine 1 0 is configured to be transported on a highway where machine width is a limiting factor. Various tunnels are shown in U.S. Pat. Nos. 5,899,247; 5,396,753; 5,297,377; 5,799,472; 5,398, 736; 5,355,659; 5,295,554; 5,140,802; 5,419,102; 5,421,142; 5,724,793; 5,894,713, the entire disclosures of which are incorporated herein by reference for all purposes.

With continued reference to FIGS. 1 through 4, the material packing assembly 22 of the bagging machine 10 may include a rotor 26. Rotor 26 may process material received by the conveyors 18 and/or 20. The bagging machine 10 may also include a cab 28, such as an operator cab for operating the bagging machine 10. The cab 28 may be attached to the frame or chassis 12.

In addition, the bagging machine 10 may include one or more radiators 30 located behind the cab. The conveyor 18 is shown in a first position in FIG. 1 located substantially above and behind the cab 28. The conveyor 18 is shown, with reference to FIG. 2, in a second position, substantially slopping from above the cab toward the ground in front of the cab. In the second position, the conveyor 18 is capable of receiving material from an unloading vehicle 32 (FIG. 4) and transferring the material up the slope of the conveyor 18 toward the material packing assembly 22. As material is emptied from an unloading truck 32 onto the conveyor 18, debris such as dry particulants, chaff, and/or other wind-blown materials cloud the area near the front of the cab 28. The one or more radiators 30 are preferably placed behind the cab 28 in order to protect and/or isolate the one or more radiators 30 from the debris near the front of the cab 28. Failure to properly isolate the one or more radiators 30 may result in clogging the coils of the radiator such that the one or more radiators 30 become incapable of properly performing their function of cooling the engine and motor systems of the bagging machine 10.

Figure 2:
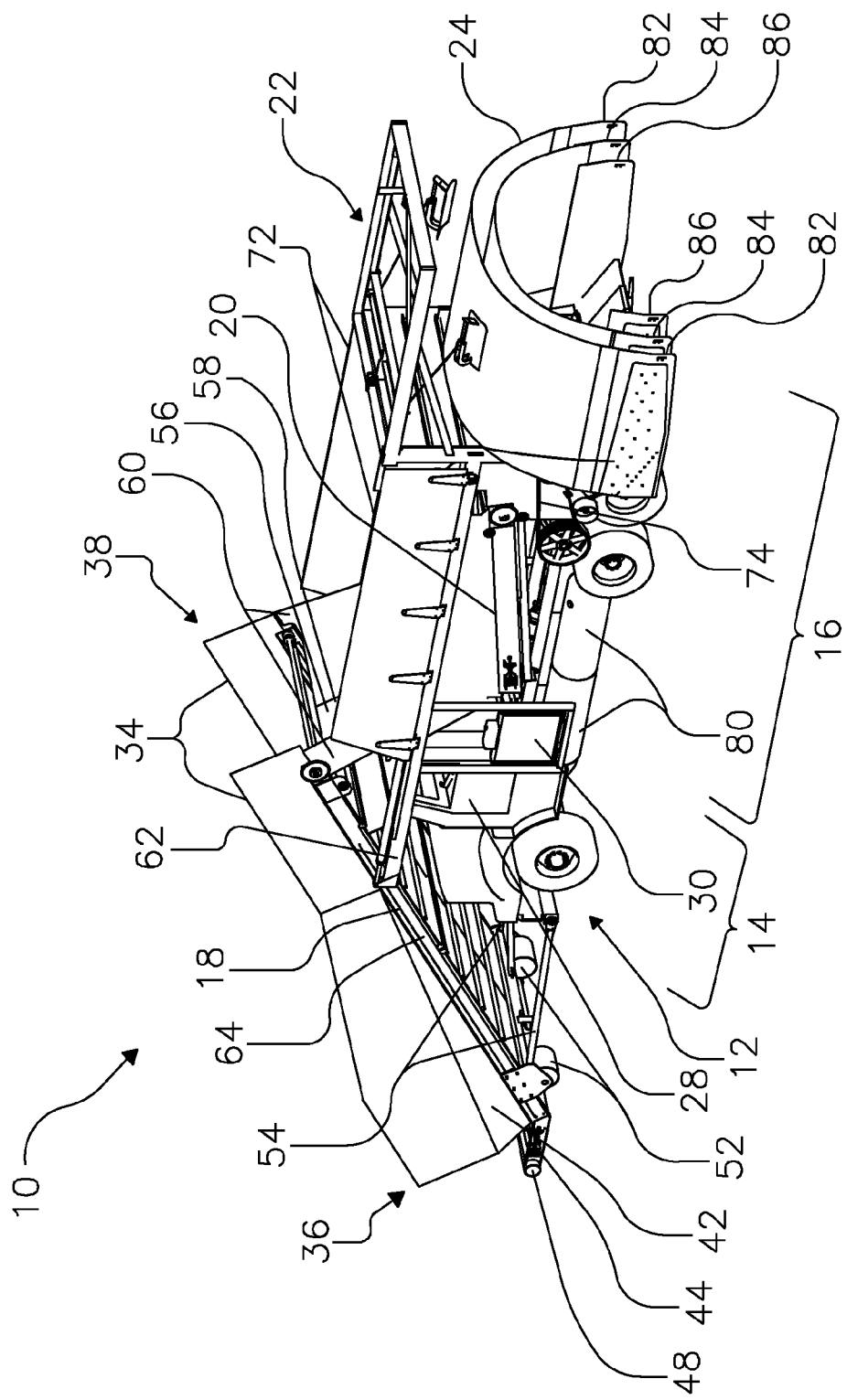
FIG. 2 is a perspective view of the side and rear portions of a bagging machine with a conveyor in a second position.
Figure 3:
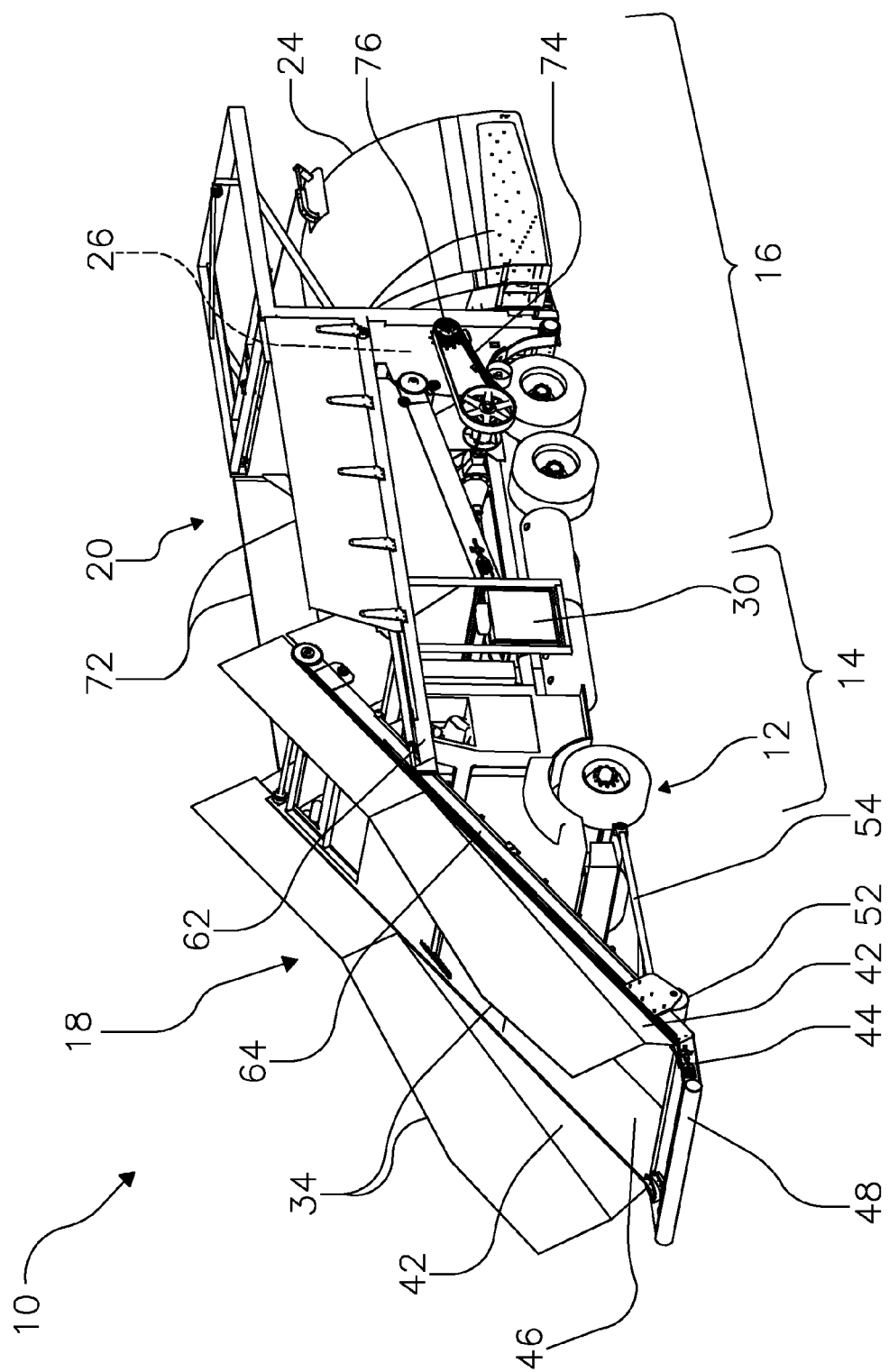
FIG. 3 is a perspective view of the side and front portions of a bagging machine with a conveyor in a second position.
Figure 4:
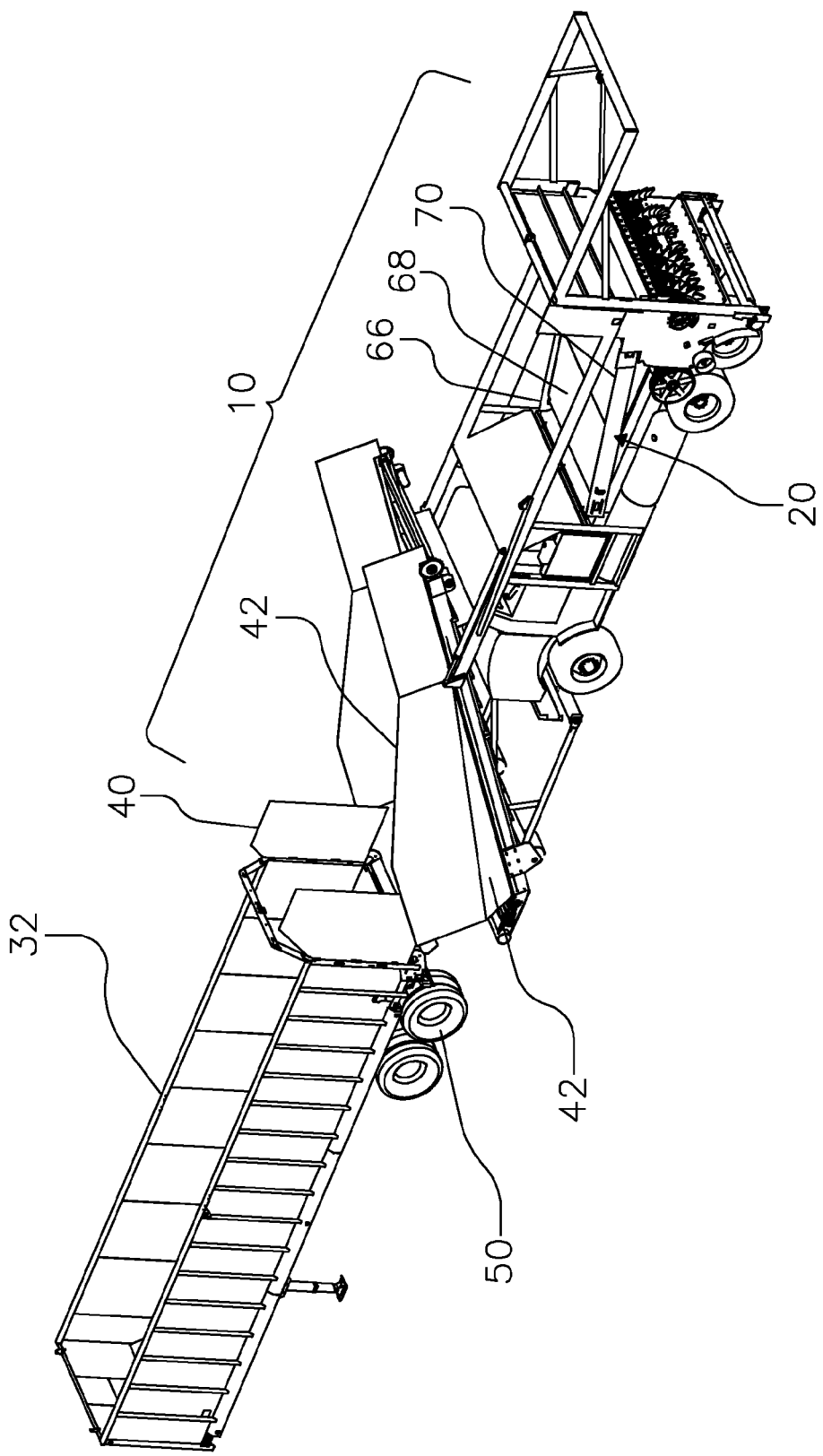
FIG. 4 is a perspective view of a bagging machine and an unloading vehicle.

With continued focus on FIG. 2, the conveyor 18 may include one or more side panels 34. The side panels 34 may run along the length of the conveyor 18 and may decrease in height and/or width between the two side panels 34 as the side panels 34 run along the length of the conveyor 18 from a front portion 36 of the conveyor 18 toward a rear portion 38 of the conveyor 18. The increased width between the two side panels 34 at the front portion 36 of the conveyor 18 permits a relatively wide unloading vehicle 32 and its doors or gates 40 to properly dock within the two side panels 34. As material is removed from the unloading vehicle 32 onto the front portion 36 of the conveyor 18, the relatively wide distance between the two side panels 34 will ensure that substantially all of the material is received by the conveyor 18. Further, one or more funneling slides 42 of the side panels 34 direct the material toward the center of the conveyor 18. At the center of the conveyor 18, a conveyor belt or other mechanism along the length of the conveyor 18 moves the materials from the front portion 36 toward the rear portion 38.

The conveyor 18 may be angled at an incline or slope greater than thirty degrees, for example, thirty-two degrees. At thirty-two degrees, most material loaded onto the conveyor 18 will, as it moves up the incline toward the rear portion 38, tumble downwards toward the front portion 36. Such tumbling may serve to process the material as the material is moved toward the material packing assembly 22. As the material is tumbled along the conveyor 18, an increased amount of material may, as it tumbles downward, reside at or near the front portion 36 of the conveyor 18. Because the side panels 34 increase in height and width at the front portion 36 of the conveyor 18, the front portion 36 forms a reservoir of the conveyor 18 which is larger than the reservoir formed at the rear portion 38 of the conveyor 18.

The side panels 34 may also be folded along a hinge and/or pivot toward each other and the center of the length of the conveyor 18. Side panels 34 are illustrated in FIG. 1 in a folded position and in FIGS. 2 through 4 in an open position.

Conveyor 18 may also include a bottom skid 44 at the front portion 36 of the conveyor 18. The bottom skid 44 may be substantially horizontal or parallel with the ground when the conveyor 18 is placed in the second position. The bottom skid 44 may receive any material which is unloaded directly below the rear most edge of an unloading vehicle 32. A conveyor belt 46 along the length of the conveyor 18 may travel through and/or around at least a portion of the bottom skid 44. Conveyor 18 may also include a wheel and/or vehicle obstruction 48 located at the front-most portion of the conveyor 18. The obstruction 48 may operate as a wheel block or stop for the wheels 50 of an unloading vehicle 32. When the rear-most wheel 50, or other structure, of the unloading vehicle 32 comes into contact with the obstruction 48, the operator of the unloading vehicle 32 will sense resistance and will understand that the unloading vehicle 32 is likely at the proper unloading position at the front portion 36 of the conveyor 18.

The obstruction 48 also resides near the conveyor belt 46 and bottom skid 44. By residing between an unloading vehicle 32 and the conveyor belt 46, bottom skid 44, and remainder of the bagging machine 10, the obstruction 48 serves as an additional protection to the structure of the bagging machine 1 0. Thus, a rear wheel 50 of an unloading vehicle 32 that is in contact with the obstruction 48 may be effectively obstructed from contact with the bottom skid 44 and/or conveyor belt 46, permitting the conveyor belt 46 and the bottom skid 44 to function properly.

The obstruction 48 may also be formed in a rounded, circular, and/or wheel-like shape which, if placed in contact with the ground, is capable of being moved in a forward and/or rearward direction while the conveyor 18 is in the second position. The conveyor 18 may also include one or more support structures 52 in contact with the ground. The support structures may be capable of providing a foundation and/or platform between the ground and the remaining components of the conveyor 18 such that the conveyor 18 may rest upon the ground. The support structures 52 may be wheels and/or other structures capable of, similar to certain embodiments of the obstruction 48, moving in forward and/or rearward directions when the conveyor 18 is in the second position.

The conveyor 18 may include one or more bottom braces 54. A bottom brace 54 may secure the front portion 36 of the conveyor 18 to the forward end 14 and/or chassis 12 of the bagging machine 10. A bottom brace 54 may serve to stabilize the front portion 36 of the conveyor 18 and/or maintain a substantially fixed distance between the front portion 36 of the conveyor 18 and the front portion and/or forward end 14 of the bagging machine vehicle 10. One or more of the bottom braces may be removably attached to the conveyor 18 and/or the forward end 14 or any other portion of the bagging machine 10. Thus, the braces 54 may be attached when the conveyor 18 is in the second position and in use and detached when a conveyor 18 is not in use, needs to be moved between the second position and/or the first position, and/or resides in the first position.

Similar to the bottom braces 54, the bagging machine 10 may include a top brace 56. The top brace 56 may be located at or near the rear portion 38 of the conveyor 18. The top brace 56 may be secured to the rear portion 38 of the conveyor 18 and the remaining structure of the bagging machine 10. For example, the top brace 56 may be directly and/or indirectly secured to the chassis 12. The top brace 56 may be formed, at least partially, as a slide having a ramp 58 and/or one or more side panels 60. The ramp 58 and/or side panel 60 may form a slide, chute, channel, or other structure capable of conveying material from the rear portion 38 of the conveyor 18 toward another portion of the bagging machine 10. Further, the top brace 56 may serve to stabilize the rear portion 38 of the conveyor 18 when the conveyor 18 is in the second position.

When the conveyor 18 is in the first position as shown in FIG. 1, the top brace 56 may fold downward toward the cab 28 of the bagging machine 10 to provide a path and/or space for the conveyor 18 to reside above and/or behind the cab 28.

The bagging machine 10 may include at least one fulcrum 62. The bagging machine 10 includes a very large number of moving parts, many of which are of significant weight and/or structure capable of damaging the other parts of the bagging machine 10 if such parts were permitted to come into contact with each other during movement. One of the advantages of a fulcrum 62 is to provide a pivot point on which certain portions of a bagging machine 10 may slide, pivot, and/or move without coming into potentially damaging contact with other portions of the bagging machine 10. For example, the fulcrum 62 discussed with reference to FIGS. 1 through 3 may provide a pivot point for the conveyor 18 as the conveyor 18 moves between the first position and the second position.

The conveyor 18 may include one or more rails 64 along the length of the bottom surface of the conveyor 18. As the conveyor 18 is moved between the first and second positions, the rail 64 may come into contact with and/or slide along the pivot point of the fulcrum 62 in order to gracefully guide, direct, and/or provide a support for the weight of the relatively long conveyor 18. The fulcrum 62 is optimally positioned at a location above the cab 28 (and/or other structure of the bagging machine 10) requiring protection from the conveyor 18 as it is moved. Thus, the fulcrum 62 permits the conveyor 18 to slide along the fulcrum 62 along the first and second positions without coming into contact with the cab 28.

The conveyor 20 may include many of the same features as the conveyor 18. For example, the conveyor 20 may form a reservoir for receiving the material at a front portion 66 of the conveyor 20 and transferring the material along an upward incline using a conveyor belt 68 toward a rear portion 70 of the conveyor 20. The conveyor belts 68 and 46 discussed herein, may include any belt, escalator, track system, and/or other structure formed of rubber, metal, metal alloy, and/or other material capable of transferring a material from location to another location.

The conveyor 20 may also include one or more side panels 72 along the length of the conveyor 20. The side panels 72 may be foldable, similar to the side panels 34 of the conveyor 18. The conveyor 20 may be aligned along the length of the bagging machine 10 with the chassis 12, conveyor 18, top brace 56, and/or material packing assembly 22 in order to transport and/or process materials received from an unloading vehicle 32 from the front end 14 of the bagging machine 10 to the rear end 16 of the bagging machine 10. The conveyor 20 may be set at an upward incline capable of tumbling the material as the material is moved upward along the slope toward the packing assembly 22.

The conveyor 20 forms a large reservoir for the material which effectively doubles, or otherwise significantly increases, or the material reservoir capacity of the bagging machine 10. The increased reservoir capacity and material tumbling abilities of the bagging machine 10 adapt the bagging machine to receive the material from at least two unloading vehicles and to convey the material from the two separate unloading vehicles 32 continuously toward the material packing assembly 22 without interruption between an exchange of the unloading vehicle 32.

In other words, as a first unloading vehicle 32 empties, the loading vehicle 32 is removed from its position at the front portion 36 of the conveyor 18. For a brief period, the conveyor 18 does not receive any materials from any unloading vehicle 32. However, during this time, the conveyor 18 and conveyor 20 continue to tumble, process, and/or convey the material from the first unloading vehicle 32 toward the material packing assembly 22.

Later, a second unloading vehicle is docked and placed directly in front of the front portion 36 of the conveyor 18. The material from the second unloading vehicle 32 is then loaded onto the conveyor 18, providing additional material to the bagging machine 10. This additional material from the second unloading vehicle 32 combines with the material of the first unloading vehicle 32 which is currently tumbled, processed, and/or conveyed along conveyors 18 and/or 20. The combination of the two groups of materials provides a continuous, uninterrupted flow of material into the material packing assembly 22. In this manner, the conveyors 18 and/or 20 operate as staging reservoirs for the material as loading of the material on the conveyor 18 is interrupted between the exchange of unloading vehicles 32.

As discussed previously, and with continued reference to FIGS. 1 through 4, the material packing assembly 22 may include a rotor 26. The rotor 26 may be powered by two differential-driven belts 74 applying torque to two planetary gear boxes 76 housed within the central cavity of the rotor. The two differential-driven planetary gear boxes 76 are capable of providing a conversion of torque to speed using a variety of separate gears and gear ratios. By converting torque into various speeds, the two planetary gear boxes 76 are capable of driving the rotational speed of the rotor 26 at different revolutions-per-minute. For example, in one embodiment, one or more planetary gear boxes 76 may drive the rotor 26 speed as slow as fifteen revolutions-per-minute and as fast as sixty revolutions-per-minute.

The cab 28 may include operator controls such as a rotor operation control, a first conveyor operation control, and a second conveyor operation control. The conveyor operation controls may operate the speed and/or power of the conveyors 18 and/or 20. Likewise, the rotor operation control may control the power, torque, and/or speed applied to the rotor 26. The transmission and planetary gear boxes 76, also referred to herein as gear assemblies, may be adapted to process a maximum amount of material through the rotor 26 using a minimum amount of torque and minimum revolutions-per-minute of the rotor. A transmission employed by the bagging machine 10 may be, for example, automatic and/or manual.

Figure 5:
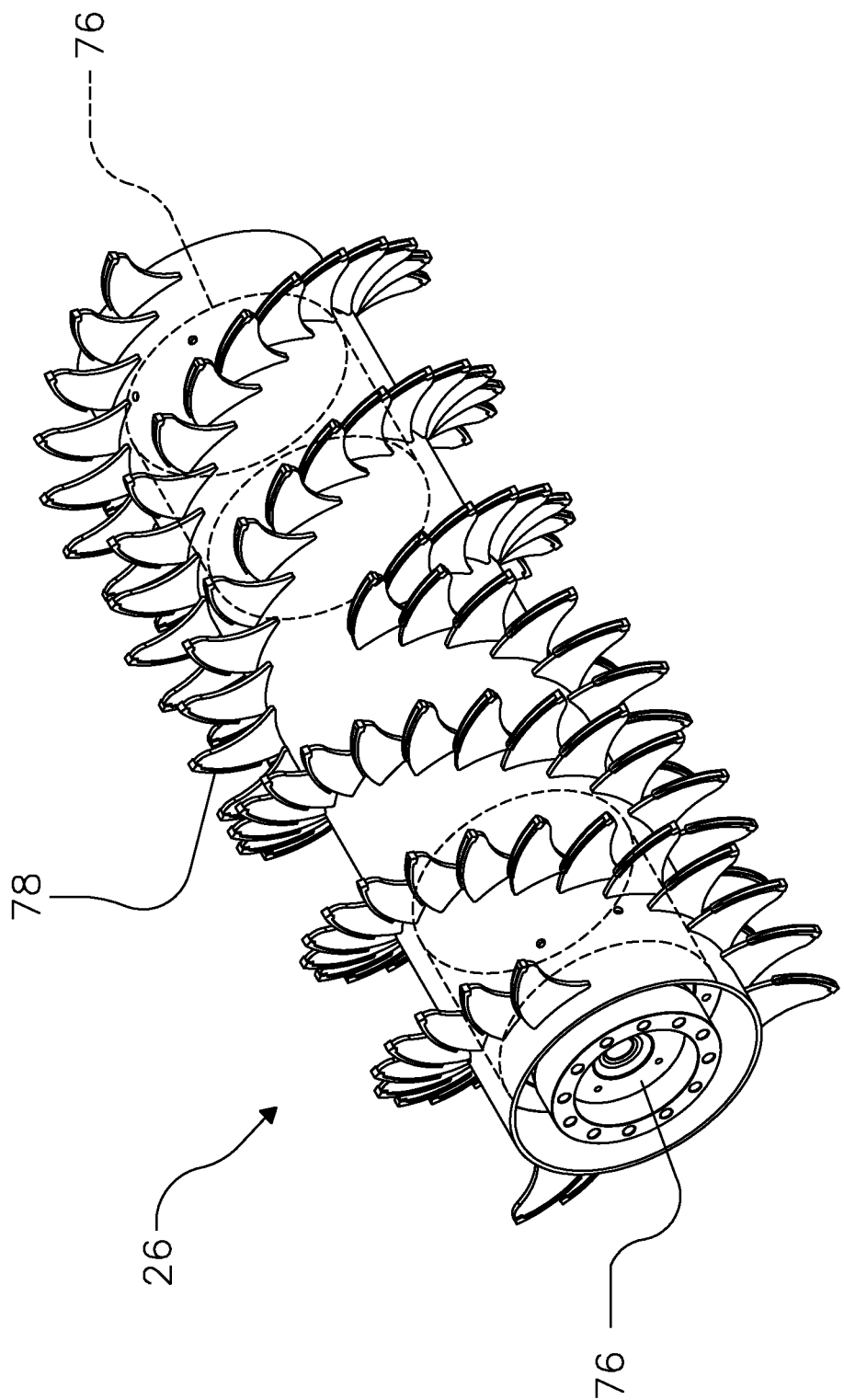
FIG. 5 is a perspective view of a rotor.

With continued reference to FIGS. 1 through 4, and with additional reference to FIG. 5, the rotor 26 may be a relatively large diameter rotor capable of housing one or more planetary gear boxes 76 or other gear assemblies within the cavity of the rotor. The rotor may also be relatively large in diameter in order to minimize the width of the rotor 26 while maximizing the total effective surface area of the rotor 26 capable of processing the material through the material packing assembly 22 and into the tube 24. For example, conventional rotors are typically approximately 132 inches wide and 22 inches in diameter when measuring the outside diameter of the swing of the teeth. By contrast, the rotor of the present invention may be approximately 100 inches wide and 30 to 50 inches in diameter. For example, the rotor 26 may be approximately 40 inches in diameter when measured from the outside diameter of the teeth 78 attached to the rotor 26. The teeth 78 of the rotor may reside on a rotor pipe that is approximately 26 inches in diameter with a ½ inch thick wall. In order to maximize material processing, the relatively large diameter rotor 26 provides a surface area for three symmetrical patterns of tines or teeth 78 arranged along the outer surface of the rotor 26.

In embodiments where the transmission system of the bagging machine 10 is automatic, the transmission may automatically shift from one gear into another gear when the material in contact with the rotor 26 causes an increase in resistance against the rotating direction of the rotor 26. This shift from one gear to another may slow the rotational speed of the rotor 26 under the same amount of torque, increasing the power of rotor 26 to enable it to process the material having an increased resistance to the rotor 26. Likewise, an automatic transmission may automatically shift from one gear to another gear when the material in contact with the rotor 26 causes a decrease in resistance against the rotating direction of the rotor 26. In this example, the rotational speed of the rotor 26 may increase until a desired amount of resistance between the material and the rotational direction of the rotor is reached. Similarly, an operator within the cab 28 or operating a transmission control located elsewhere on the bagging machine 10 may manually shift the transmission from one gear to another gear in order to adjust the rotational speed of the rotor 26. In the examples above, the transmission may be powered by the motor of the bagging machine 10 to convert torque from the motor to different rotational speeds of the rotor 26.

Various auxiliary systems and structures may provide the necessary operational support to any system or component of the bagging machine 10. For example, fuel tanks 80 may provide reservoirs for one or more motors or engines of the bagging machine 10. Additionally, hydraulic power systems may exist in order to move and/or control the movement of various components of the bagging machine 10, such as the conveyor 18 from between the first position and the second position, the operation of the material packing assembly 22 and/or the size, movement, and/or operation of the tunnel 24.

After the material is processed, mashed, and/or shredded into small fibers by the teeth 78 of the rotor 26 from the material packing assembly 22, the material enters into the central chamber or cavity of the tunnel 24. As previously discussed, a tunnel of the bagging machine 10 will optimally be capable of resizing between larger and smaller diameters. Thus, the tunnel 24 is capable of moving, for example, from a diameter of approximately 14 feet to a diameter of approximately 12 feet and further to an even narrower diameter of approximately 118 inches (or less than 10 feet) for transportation within a single lane of freeways and/or highways on American, European and/or other roads. FIGS. 1 and 2 illustrate the three different positions of a 14-foot width 82, a 12-foot width 84, and a 118-inch width 86. Thus, the bagging machine 10 includes and inline conveyor system of conveyor 18 and conveyor 20, a narrow rotor 26 with internal planetary gear boxes 76, and/or an expandable and collapsible tunnel 24 which provide a relatively narrow width of the bagging machine 10. In one embodiment, the mobile bagging machine 10 is less than about 118 inches wide at its widest point.

Figure 6:
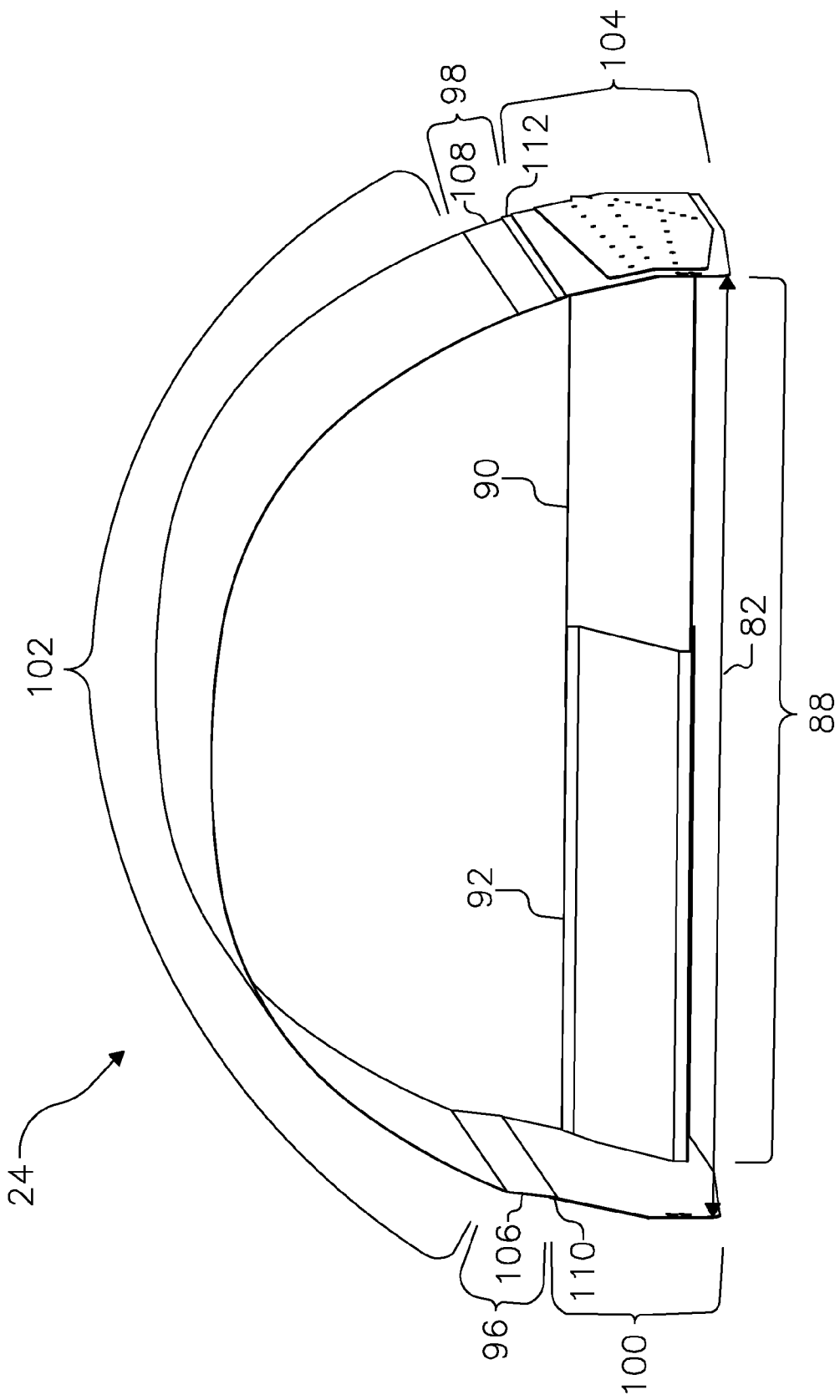
FIG. 6 is a perspective rear view of an expanded tunnel.

The expandable, collapsible, and/or retractable tunnel 24 will now be discussed in greater detail and with simultaneous reference to FIGS. 6 through 8. Referring to FIG. 6, a tunnel 24 expanded to a width 82 of 14 feet is shown. The tunnel 24 is an expandable, collapsible, and/or retractable tunnel. The tunnel 24 may include an expandable base 88 and an expandable tunnel portion secured to the base 88. The expandable base 88 may include a first telescoping member 90 and a second telescoping member 92. The first telescoping member 90 may reside at least partially in movable communication with the second telescoping member 92. For example, the first telescoping member 90 may slide at least partially within the second telescoping member 92 in a manner that changes the overall combined length of the first telescoping member 90 and second telescoping member 92 forming the expandable base 88.

The expandable base 88 serves to provide structural support for the remaining portion of the tunnel 24. In addition, the expandable base 88 may provide a downward sloping ramp for receiving and/or transferring the material received from the rotor 26 and packing assembly 22 of the bagging machine 10. As the material slides down the downward slopping ramp of the expandable base 88, the material advances to a rearward end of the tunnel 24 and into a bag or other receptacle for the material.

Figure 8:
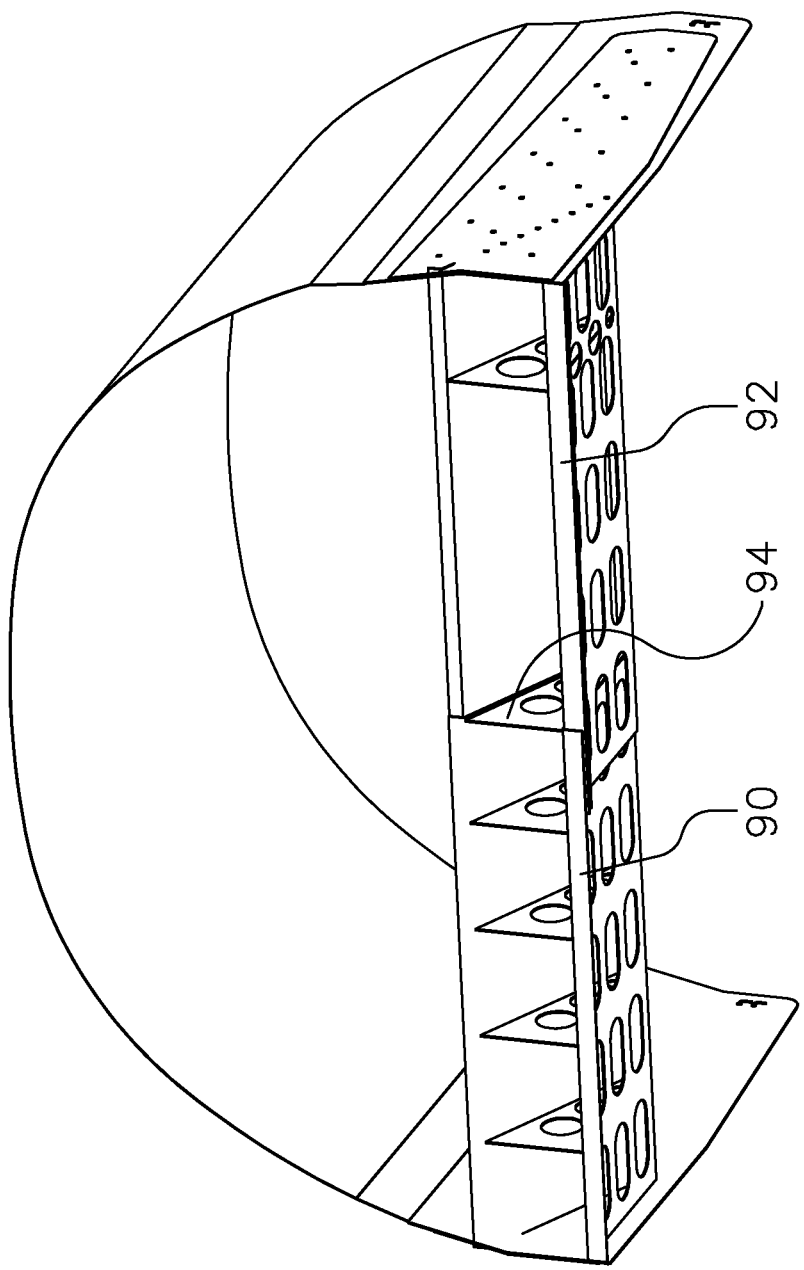
FIG. 8 is a perspective front view of a tunnel.

Referring simultaneously to FIGS. 6 and 8, each of the telescoping members 90 and 92 of the base 88 may require one or more support structures 94 within the base 88. The one or more support structures 94 may be formed within either of the telescoping members 90 and/or 92. The support structures 94 are capable of maintaining the shape of the downward slopping ramp of the base 88 under the weight and pressure of material processed by the packing assembly 22. The support structures should be configured to enable interlocking material of either of the telescoping members 90 and/or 92 to interlock with material of the other telescoping member in a manner that ensures smooth telescoping movement between the first telescoping member 90 and the second telescoping member 92.

Referring primarily to FIG. 6, the expandable tunnel may also include a first expandable portion 96 and a second expandable portion 98. The first expandable portion 96 and/or second expandable portion 98 may include structure capable of modifying, collapsing and/or retracting the overall internal width, diameter, and/or volume of the tunnel 24.

The entire outer arch of the tunnel 24 may be formed of a first end 100, the first expandable portion 96, a central portion 102, the second expandable portion 98, and/or a second end 104. The first expandable portion 96 may include a first intermediate portion 106. The first intermediate portion may be connected to the first end 100, and the central portion 102. The second expandable portion 98 may include a second intermediate portion 108. The second intermediate portion may be connected to the second end 104 and central portion 102.

The central portion 102 of the tunnel 24 may be formed of a flexible and/or pliable material such as a thin sheet of aluminum. The first and/or second ends 100 and/or 104 may be formed of a material such as a metal that is more rigid and/or less flexible or pliable than the material of the central portion 102. The first intermediate portion 106 and second intermediate portion 108 may both be secured to the central portion 102 by means of a hinge or similar movable connection. Similarly, the intermediate portion 106 may secure by means of a hinge or similar connection to the first end 100, and the second intermediate portion 108 may be hinged or otherwise secured to the second end 104. The first end 100 and/or second end 104 may include a first movement stop 110 and/or a second movement stop 112, respectively. The movement stops 110 and 112 may include any structure near and/or integrated with the hinge between the first and second intermediate portions 106 and 108 and their corresponding first and second ends 100 and 104. The first end and/or second movement stops 110 and/or 112 may for example be a hinge stop. The hinge stop, in this particular embodiment discussed with reference to FIG. 6, is a flap of material overlapping on the outside surface of the bottom portion of either the first intermediate portion 106 and/or second intermediate portion 108.

The hinge stops prevent the first and/or second intermediate portions 106 and/or 108 from rotating away from the inner cavity of the tunnel 24 beyond a substantially coplanar relationship with the first and/or second ends 100 and/or 104 when the first and/or second expandable portions 106 and/or 108 are in an expanded state. As shown in FIG. 6, with the width 82 of 14 feet, the first and/or second intermediate portions 106 and/or 108 are shown in their expanded state. Similarly, the first and second telescoping members 90 and 92 are shown in FIG. 6 as expanded and telescoped outwards enabling the width 82 of the tunnel 24 to be approximately 14 feet.

Figure 7:
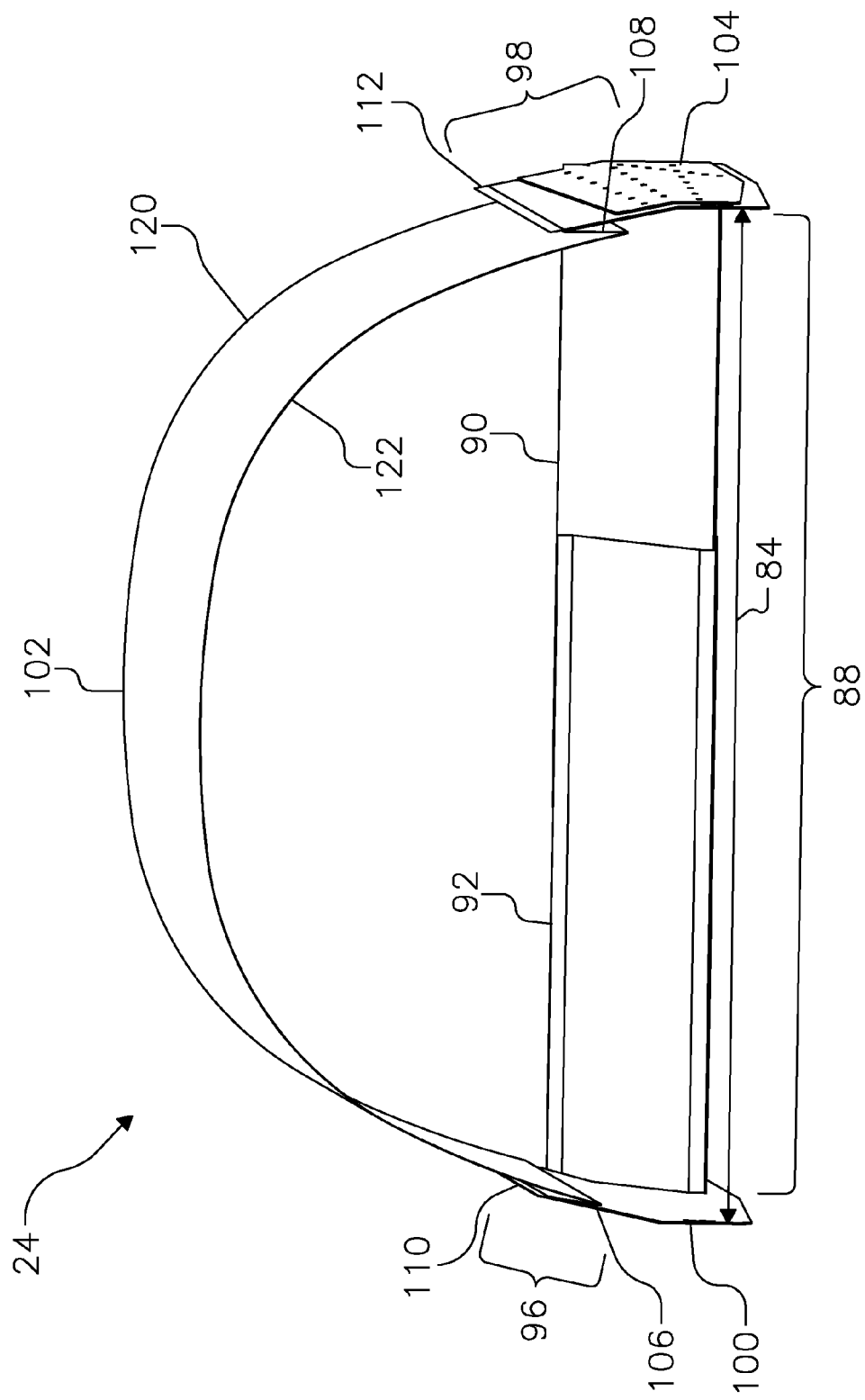
FIG. 7 is a perspective rear view of a retracted tunnel.

Referring to FIG. 7, the tunnel 24 may move from its expanded state as shown in FIG. 6 to a collapsed or retracted state as shown in FIG. 7. In the collapsed or retracted state, the first intermediate portion 106 and/or second intermediate portion 108 have rotated toward the inner cavity of the tunnel 24 along substantially parallel hinges between the central portion 102 and the first and/or second ends 100 and/or 104 respectively. The first and/or second intermediate portions 106 and/or 108 have rotated inward along the parallel hinges to form one or more folds between the central portion 102 and the first end 100 and/or second end 104.

When one or more folds are formed by the intermediate portions 106 and/or 108, the central portion 102 overlaps with the first end 100 and/or second end 104 toward the inner cavity of the tunnel 24. When the central portion 102 is overlapped toward the inner cavity of the tunnel 24, the first end and/or second expandable portions 96 and/or 98 are placed in a retracted state.

In the retracted or collapsed state, the tunnel 24 may include an internal width and/or diameter 84 of approximately 12 feet. When the expandable tunnel 24 is in its expanded state as shown in FIG. 6, a large organic material packing bag may be used in connection with the tunnel 24. When the expandable tunnel 24 is in its collapsed or retracted state as shown in FIG. 7, the expandable tunnel 24 may be used in connection with a small organic material packing bag. Organic material packing bags larger than 14 feet and smaller than 12 feet in diameter may be used in connection with the expandable tunnel 24.

With continued reference to FIG. 7, the expandable tunnel 24 in its retracted state may include one or more folds along the first expandable portion 96 and/or second expandable portion 98. Further, the expandable base 88 may be collapsed and/or retracted by sliding the first telescoping member 90 and second telescoping member 92 together such that, in this particular example embodiment, the total overall length of the first and second telescoping members 90 and 92 of the expandable base 88 are approximately 12 feet in length.

When the first and/or second expandable portions 96 and/or 98 are placed in a folded and/or retracted or collapsed state, the material within the inner chamber of the tunnel 24 may force the central portion 102 against the first and/or second intermediate portions 106 and/or 108. The first and/or second intermediate portions 106 and/or 108 are then in turn forced against the respective inner surfaces of the first end 100 and the second end 104. In this manner, densely-packed material residing within the inner chamber of the expandable tunnel 24 in its collapsed state will cause the tunnel 24 to remain in its collapsed state until the material is removed from the inner chamber of the tunnel 24.

Figure 9:
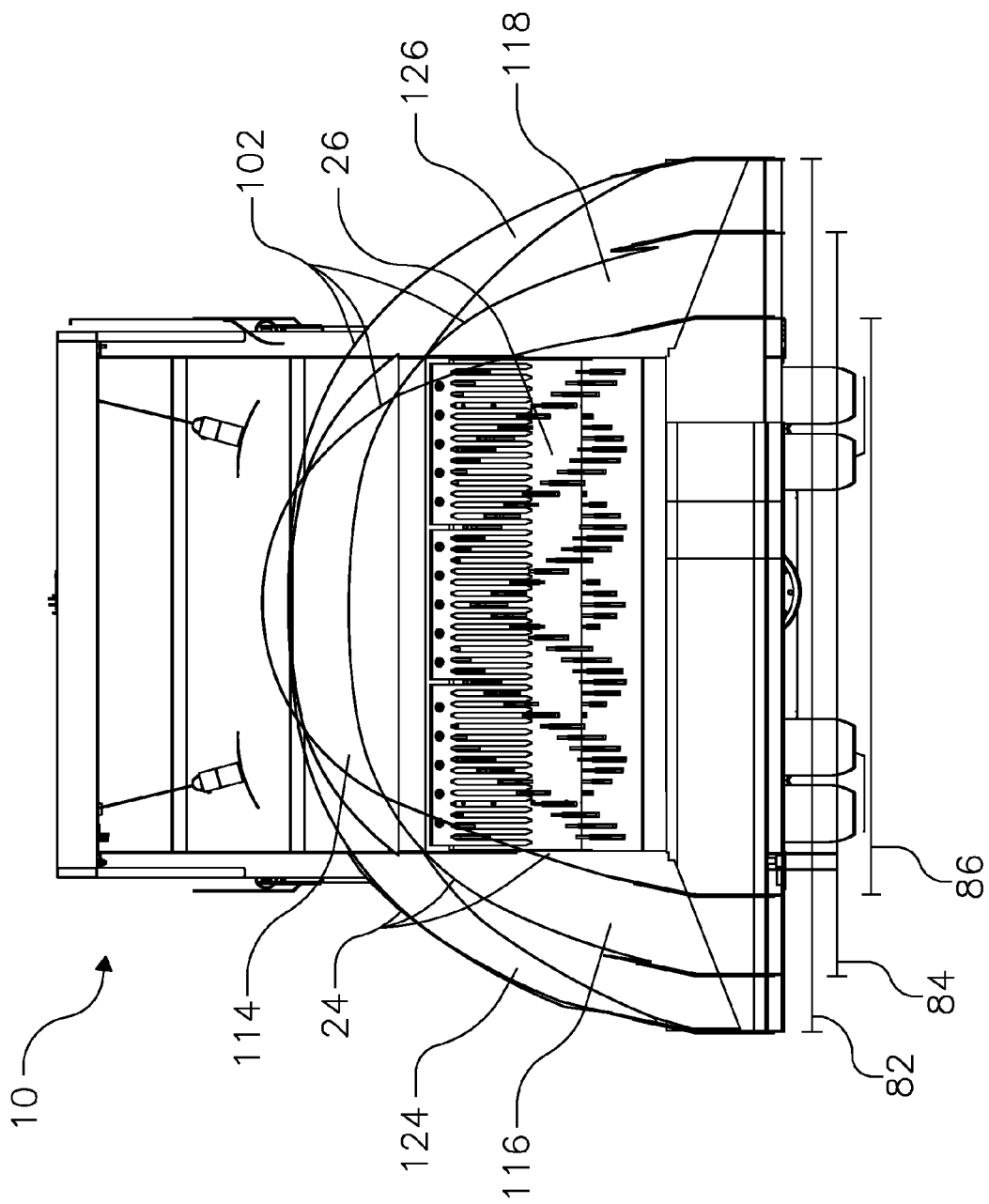
FIG. 9 is a rear view of a bagging machine.

Referring to FIG. 9, a rear view of the bagging machine 10 is illustrated showing the tunnel 24 in three example positions: the expanded state having a width 82 of approximately 14 feet, the retracted state having a width 84 of approximately 12 feet, and a further retracted state having a width 86 of approximately 118 inches. The rear view of the bagging machine 10 further illustrates the rotor 26 seen through the central cavity of the tunnel 24.

In addition, the bagging machine 10 and/or tunnel assembly may include one or more panels such as a central panel 114, a first side panel 116, and/or a second side panel 118. The panels 114, 116, and 118 may form part of the material bagging assembly and/or packing assembly 22 or may form part of the tunnel 24. The central panel 114 is in a corresponding shape with the central portion 102 of the tunnel 24. The central panel 114 may at least partially enclose the inner cavity of the expandable tunnel 24 near the central portion 102 at a forward end 120 (FIG. 7) of the expandable tunnel 24. The expandable tunnel 24 may also include a rearward end 122 (FIG. 7). The central panel 114 may be secured to any portion of the bagging machine 10 by means of a hinge or other pivoting connection capable of rotating and/or otherwise moving or adjusting the central panel 114 in relation to the forward end 120 of the tunnel 24. The position of the central panel 114 may need to be adjusted as the expandable tunnel 24 is expanded and/or collapsed. To facilitate movement control of the central panel 114, a hydraulic cylinder may also be secured to a portion of the central panel 114.

The first and/or second side panels 116 and/or 118 may respectively include first and/or second expandable side panels 124 and/or 126. The first and/or second side panels 124 and/or 126 may be raised and/or lowered in order in increase and/or decrease the overall surface area of the first and/or second side panels 116 and/or 118. The first and/or second side panels 116 and/or 118 operate similar to the central panel 114 in that they are used to at least partially enclose the inner cavity of the tunnel 24. The first and/or second side panels may be hinged to any portion of the mobile bagging machine 10 such that the first and/or second side panels 116 and/or 118 may rotate upon an axis or otherwise adjust their location and/or position with respect to either side of the front portion 120 of the tunnel 24. Thus, the first and/or second side panels 116 and/or 118 may be used and/or moved to accommodate various widths of the tunnel 24 as it expands and retracts.

The panels 114, 116, and/or 118 operate to further enclose the chamber of the tunnel 24 in order to prevent the material from escaping the tunnel 24 at the forward end 120. Panels 114, 116, and/or 118 and expandable side panels 124 and/or 126 may be formed of any material, for example, sheet metal, a metal alloy, a polymer, rubber, and/or another material capable of enclosing a space. A pliable, flexible, and/or malleable material with sufficient strength and/or rigidity to contain the material within the chamber of tunnel 24 may be preferable. Such material may move to accommodate the expanding and/or retracting of the tunnel 24 yet maintain sufficient enclosure for the material.

Figure 10:
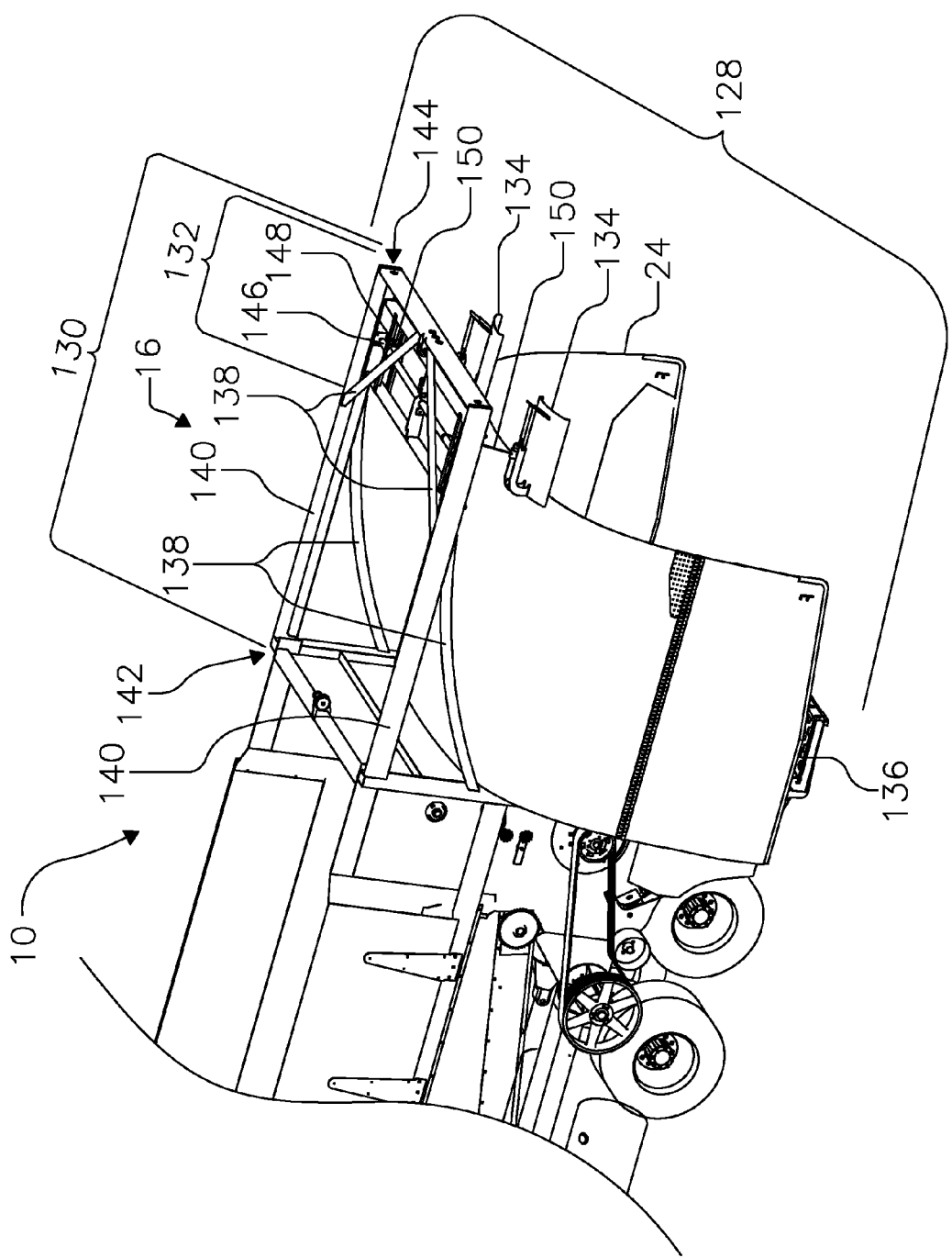
FIG. 10 is a perspective view of a bag installation and/or deployment system.

The bagging machine 10, or any other mobile or immobile bagging machine, may be operated in conjunction with bag installation and/or deployment systems and/or methods. Example bag installation and deployment systems and methods are described with reference to FIGS. 10 through 18. Referring to FIG. 10, a bag system 128 may be secured to the rearward portion or end 16 of a bagging machine 10 near a tunnel 24. The bag system 128 may include a support structure 130 (for example, a trolley conveyor frame), a movable winch or crane frame 132 (for example, a movable trolley crane), at least one bag attachment 134 (for example, a bag spoon), and/or at least one bag support structure 136 (for example, a bag pan, belt, grid, grate, bars, or similar structure).

The structure 130 may be secured to the rearward portion or end 16 of a bagging machine 10 and be situated above the top of and extend beyond the rear of a tunnel 24. The structure 130 should be sufficiently strong to at least partially bear the weight of the frame 132, attachment(s) 134, and a bag installed thereon and deployed therewith. The structure 130 may include at least one brace 138 and/or at least one rail 140. The brace(s) 138 may serve to stabilize and support the rail(s) 140. The rail(s) 140 may be situated parallel to each other. The rail(s) 140 may serve to provide a path upon which the movable frame 132 may travel.

The frame 132 may be secured to the rail(s) 140 such that the frame 132 may move between and along the length of the rail(s) from a front end 142 of the structure 130 to the rear end 144 of the structure 130. The frame 132 may include at least one retraction structure such as a crane and/or winch 146 and at least one cable guide 148, such as a roller. The winch 146 may rotate under the force generated by a motor secured to the frame 132, structure 130, and/or bagging machine 10. When rotated, the winch 146 may wind or unwind cable 150 around the shaft of the winch 146, depending upon the direction of rotation of the winch 146 shaft. The term "cable" as used herein and in the claims is defined broadly to include any cord, rope, chain, or other elongated structure capable of attaching to and/or pulling another structure. The cable guide (s) 148 serve to direct the cable 150 outwards towards the ends and away from the center of the winch 146 shaft in order to ensure that the cable 150 remains at the ends of the winch 146 shaft, thus drawing the remaining portions of the cable 150 towards opposite ends of the winch 146 shaft. The ends of the cable 150 opposite the winding ends of the cable may be attached to the bag attachment(s) 134. Thus, as the cable 150 winds upon the winch 146 shaft, the cable 150 and bag attachment(s) 134 are drawn towards the ends of the winch 146 shaft and separate cable guides 148.

Figure 11:
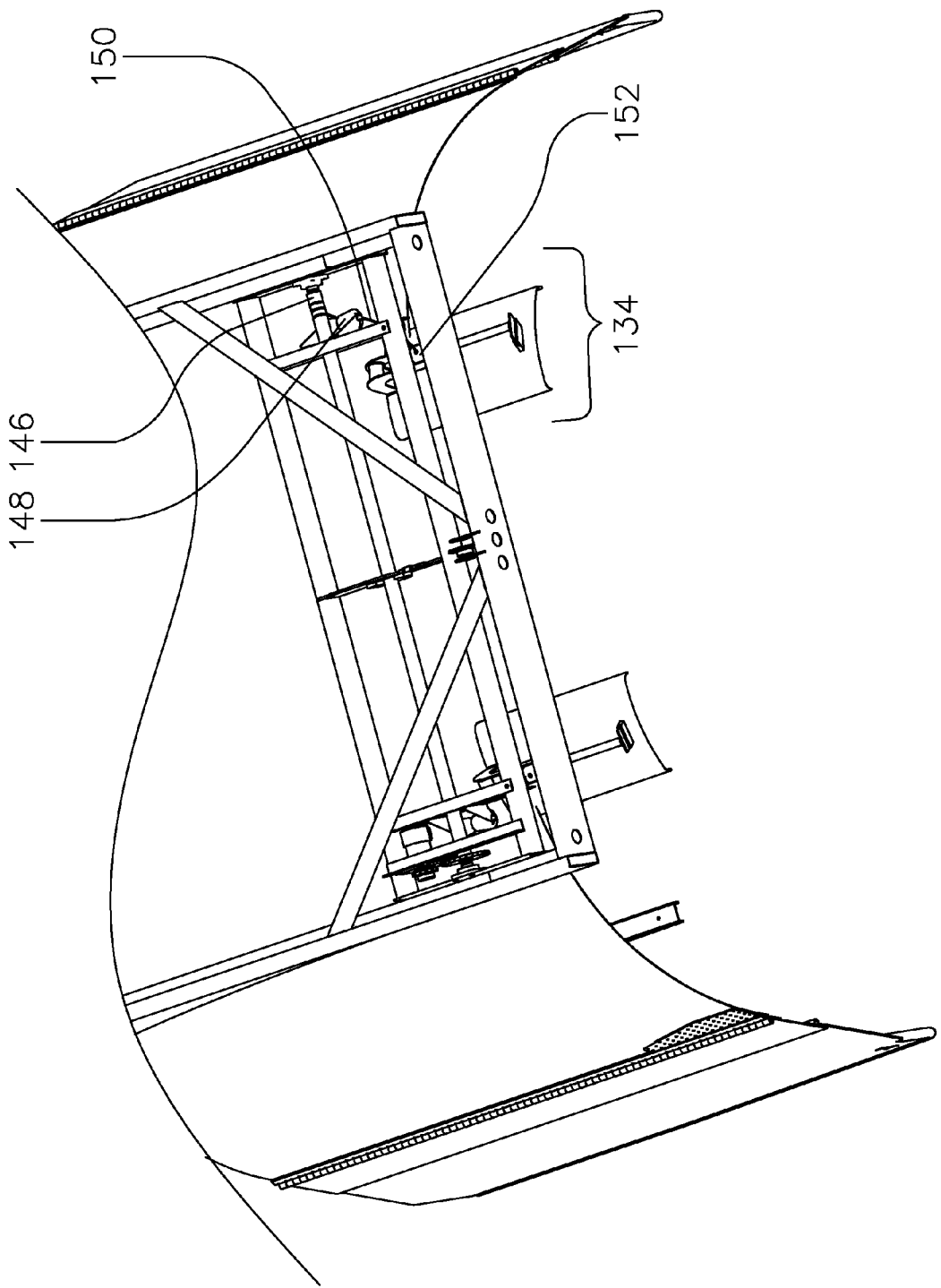
FIG. 11 is a perspective top view of a bag attachment and a winch.

Referring to FIG. 11, the bag attachment(s) 134 may include two bag attachments 134 or a single bag attachment 134 that includes at least two bag attachment points capable of moving away from each other and of actively spreading and opening two separate sections of a bag. The two bag attachments 134 or single bag attachment 134 with two bag attachment points is a significant improvement over prior art bag cradles, which operate as single, unified structures incapable of spreading or separating in relation to itself and incapable of actively spreading or separating two separate sections of a bag during installation. Each of the two bag attachments 134 may be secured to separate cables 150, which cables 150 are in turn secured to opposite ends of the winch 146 shaft. The cables 150 may each be crimped, tied, locked, or otherwise secured at one end of the cables 150 to each end of the winch 146 shaft through holes in the center of the shaft, and at the other end of the cables 150 to holes in a cable termination 152 at each bag attachment 134. Each cable termination 152 may be include a rounded and/or tubular external surface. Each cable guide 148 may likewise include a rounded and/or tubular external surface. In one embodiment, both the terminations 152 and the guides 148 include rounded tubular external surfaces substantially parallel to each other. In such embodiment, when the winch 146 rotates the cables 150 around the winch, the cables 150, bag attachments 134, and terminations 152 are drawn towards the winch 146 and guides 148. As the terminations 152 reach and are pulled towards the guides 148, the rounded tubular external surfaces of the terminations 152 align with the rounded tubular external surfaces of the guides 148, such that the terminations 152, attachments 134, and guides 148 become parallel with each other. Even after the terminations 152 contact and become parallel with the guides 148, the tubular external surfaces of the terminations 152 may roll and rotate upon the tubular external surfaces of the guides 148, enabling the attachments 134 to sway towards and away from each other.

Figure 12:
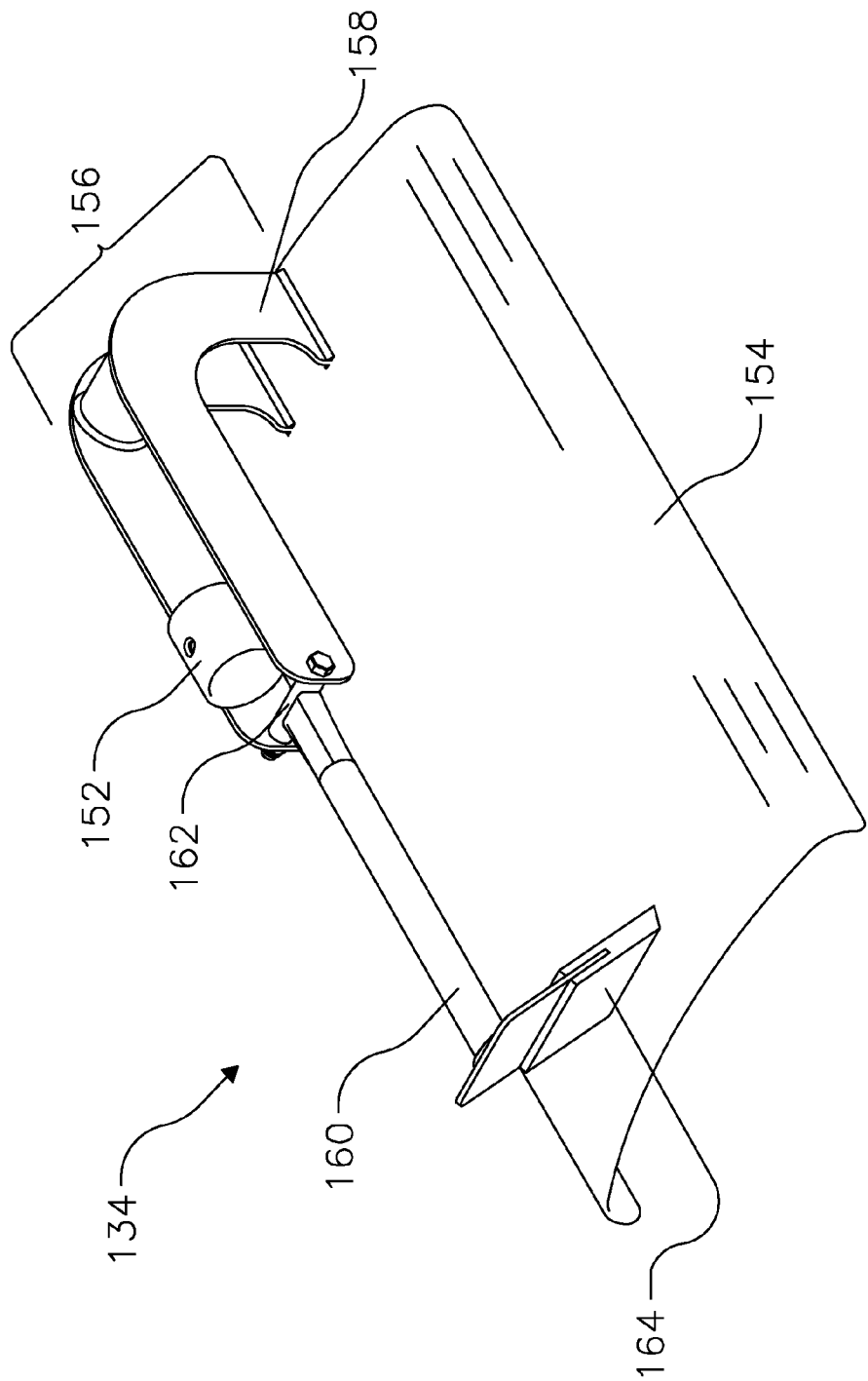
FIG. 12 is a perspective view of a bag attachment.

Referring to FIG. 12, a bag attachment 134 may include a cable termination 152. The cable termination 152 may be any structure capable of securing attachment 134 to another portion of a bag machine. Bag attachment 134 may also include bag carry portion 154 and a bag retainer portion 156. The bag carry portion 154 may include any structure capable of at least partially bearing the weight of a bag. In this example, the bag carry portion 154 includes a rounded top surface with a thin, yet strong profile and a relatively large surface area capable of both easily engaging with a folded bag when it sits in a shipping box and suspending the bag in the air when the attachment 134 and it associated cable 150 are retracted by a winch 146. A rounded, smooth, and slick surface of the bag carry portion 154 engage with an underside of a top portion of a folded bag in a manner that permits the bag carry portion 154 to slide along the inner circumference of the folded bag.

The bag retainer portion 156 may be formed to permit a space between the bag retainer portion 156 and the bag carry portion 154 sufficiently large to receive, install, and/or deploy at least a portion of a folded bag. The bag retainer portion 156 may include a fixed retainer 158 and/or a movable retainer 160. The fixed retainer 158 may secure the termination 152 and the bag carry portion 154. The fixed retainer 158 may also be pivotally or movably secured to the movable retainer 160 upon a hinge 162. The hinge 162 may permit the movable retainer 160 to pivot upon the fixed retainer 158 and away from the bag carry portion 154, causing the space between the bag carry portion 154 and bag retainer portion 156 to open and increase.

When the movable retainer 160 is pivoted away from the bag carry portion 154 and in open position, a portion of a folded bag may be easily inserted into the space between the bag retainer portion 156 and the bag carry portion 154. Upon full or partial insertion of the bag into the space between the bag retainer portion 156 and the bag carry portion 154, the movable retainer 160 may be moved back into closed position by pivoting the movable retainer 160 upon the hinge 162 towards the bag carry portion 154, until the opening in the space between the movable retainer 160 and the bag carry portion 154 is substantially closed. At least a portion of the bag may remain in the substantially closed space between the movable retainer 160 and the bag carry portion 154.

The movable retainer 160 may include an angled wedge 164. The angled wedge 164 may be located at the end of the movable retainer 160 opposite the hinge 162. The angled wedge 164 may be formed at an angle less than ninety degrees from the body of the movable retainer 160. When at least a portion of a folded bag is inserted in the space between the bag retainer portion 154 and the bag carry portion 154, and depending upon the orientation of the attachment 134, the angled wedge 164 may bear the weight of at least a portion of the folded bag, causing the angled wedge 164 and movable retainer 160 to be directed towards the bag carry portion 154. Further, during operation of a bagging machine and deployment of a bag from the bag system, the bag may be drawn and metered from between the substantially closed space between the bag carry portion 154 and the angled wedge 164 and away from the space formed between the bag carry portion 154 and the bag retainer portion 156.

Figure 13:
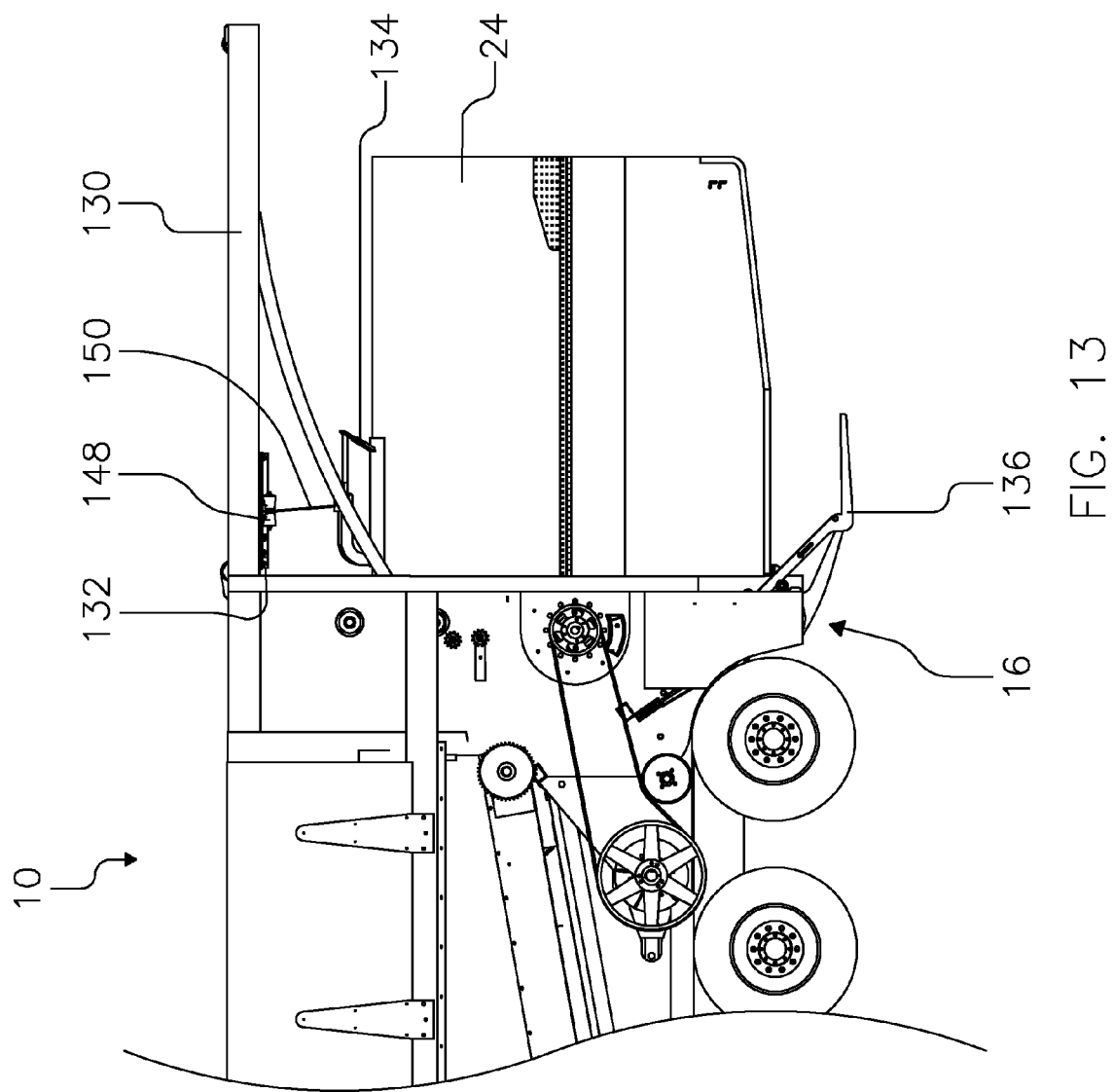
FIG. 13 is a side view of a bag installation and/or deployment system.
Figure 14:
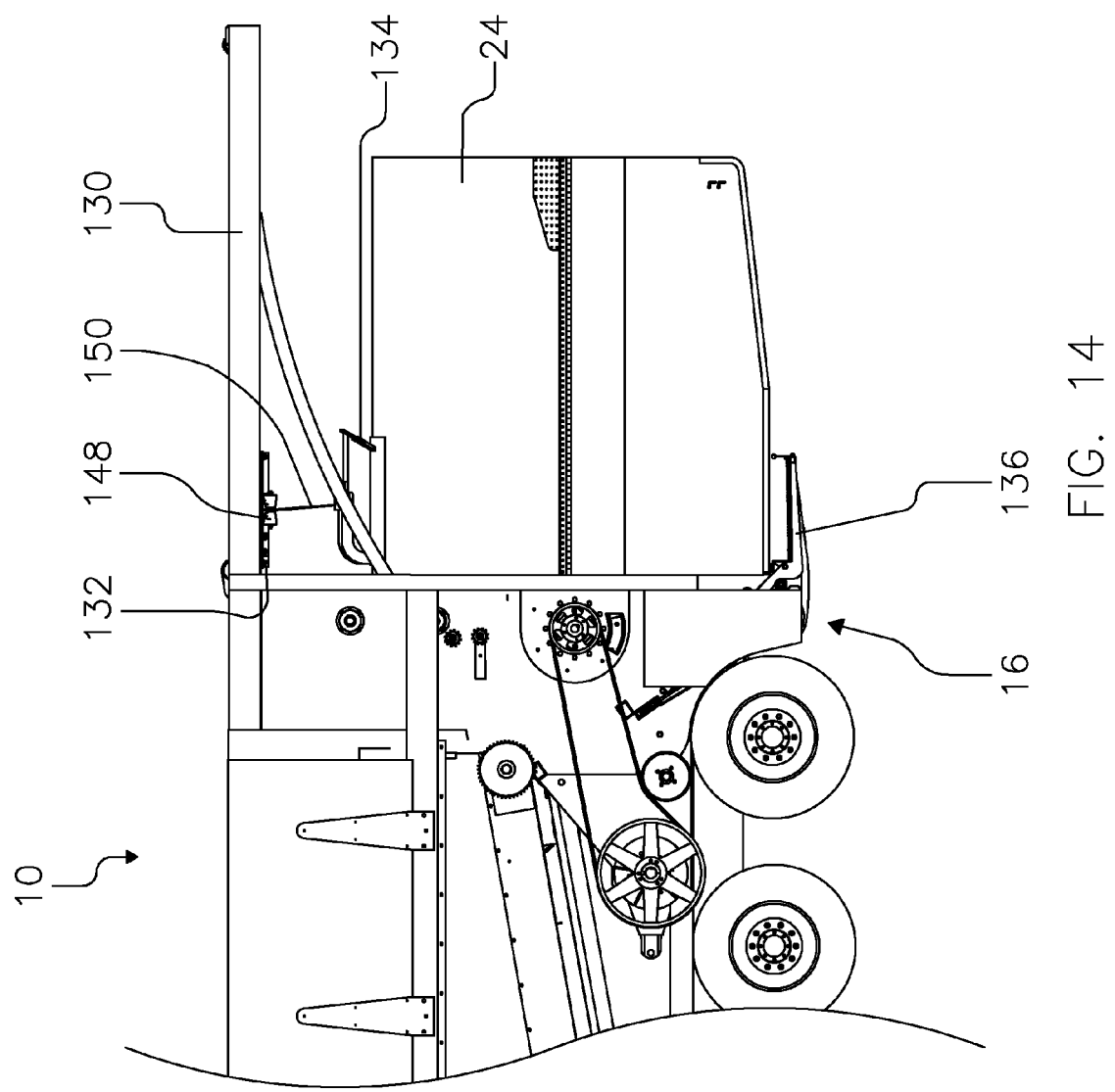
FIG. 14 is a side view of a bag installation and/or deployment system.
Figure 15:
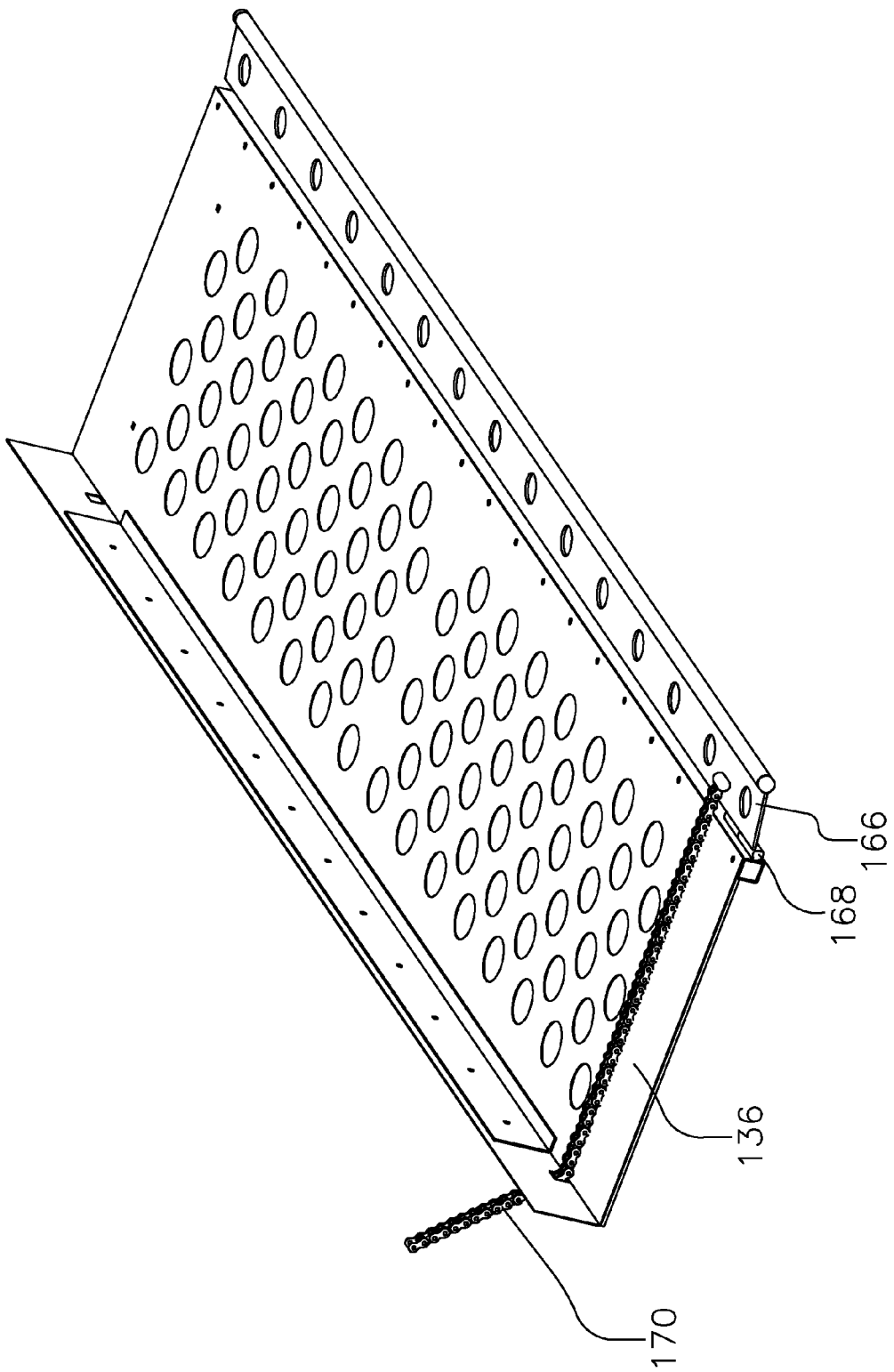
FIG. 15 is a perspective view of a bag support structure.

Referring to FIGS. 13 through 15, a bag support structure 136 may be secured to a rearward or back end 16 of a bagging machine 10 beneath a tunnel 24. The bag support structure 136 may be lowered (FIG. 13) and raised (FIG. 14). The bag support structure 136 may include a hinged retaining lip 166 at the rear end of the structure 136. The hinged retaining lip 166 may be lowered (FIG. 13) and raised (FIG. 14) under the control of a chain, cable, or other structure connected to a power source, such as a motor. The bag support structure 136 and hinged retaining lip 166 may be lowered in order to receive the bottom portion of a folded bag when the top portion of the folded bag is installed on at least one bag attachment 134. After at least a portion of the bag is received upon the top surface of the bag support structure 136, the bag support structure 136 and/or hinged retaining lip 166 may be raised. In the raised position, both the bag support structure 136 and retaining lip 166 serve to retain at least a portion of the bag during operation of a bagging machine as the bag is deployed by the bag system. Similar to the angled wedge 164, the retaining lip 166 permits the bag to be slowly drawn and metered away from the retaining lip 166 and bag support structure 136 as the bag is filled with material during operation of the bagging machine.

Figure 16:
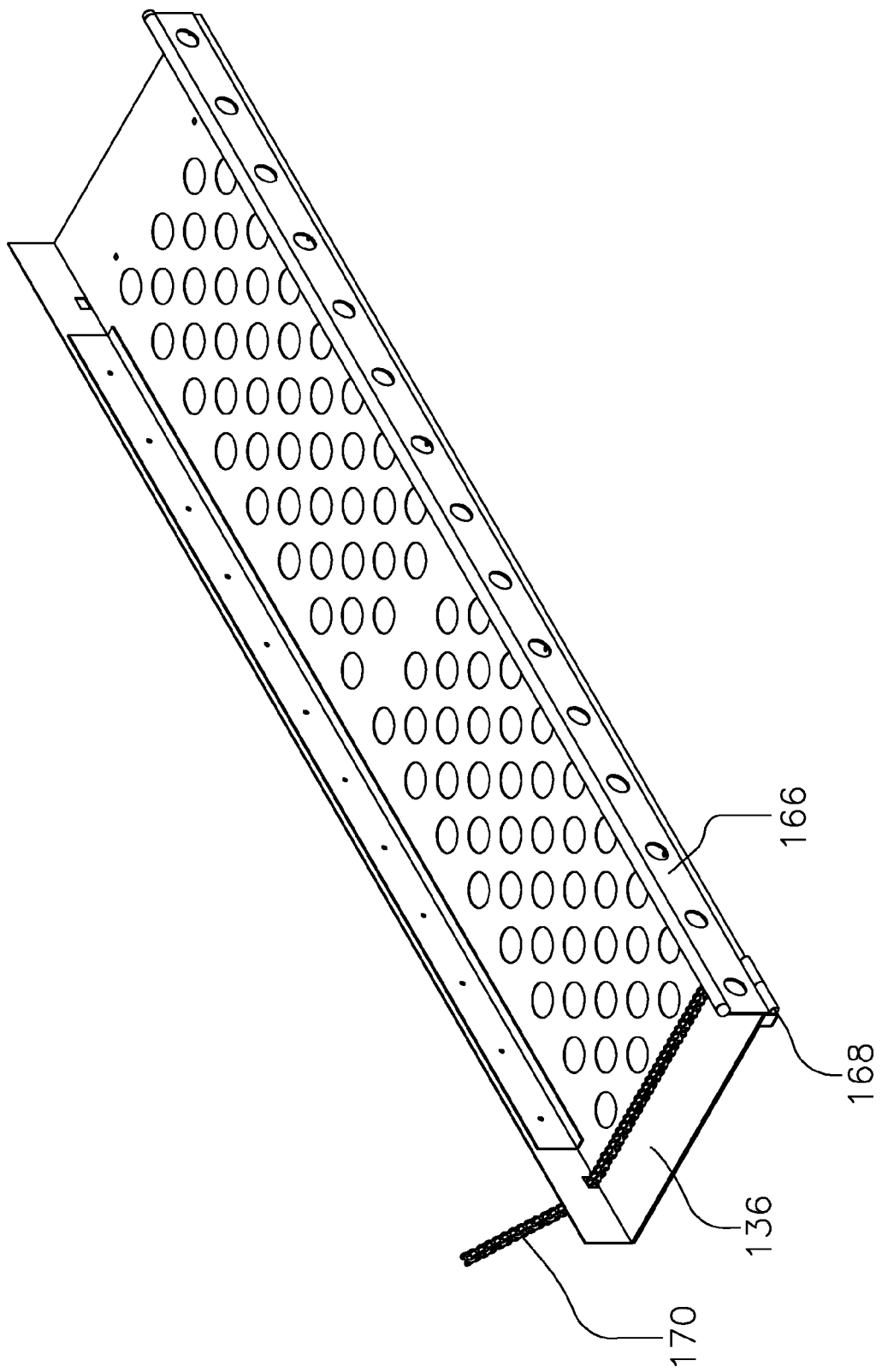
FIG. 16 is a perspective view of a bag support structure.
Figure 17:
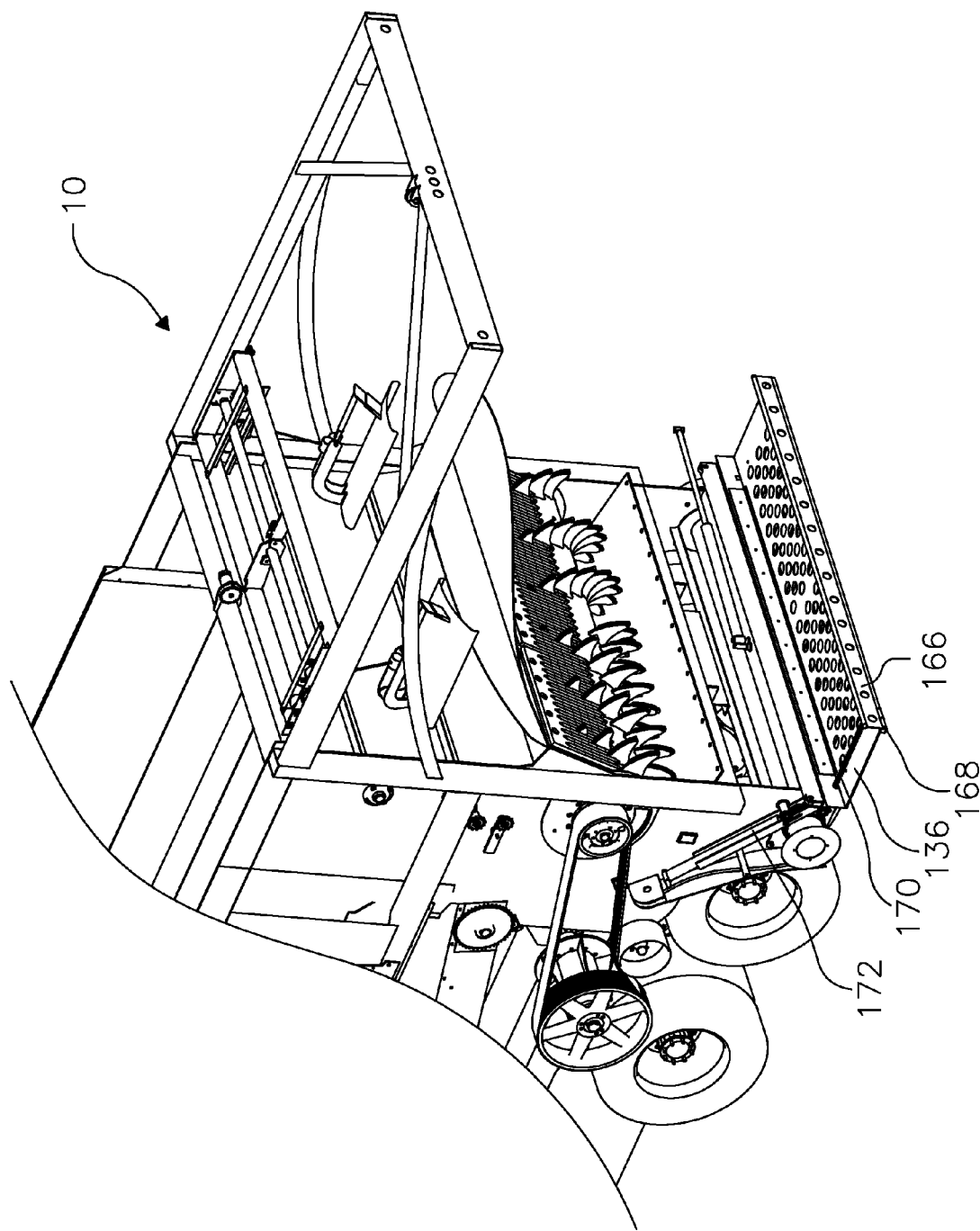
FIG. 17 is a perspective rear view of a bag support structure secured to a bagging machine.

Referring to FIGS. 15 through 17, the retaining lip 166 may be lowered (FIG. 15) and raised (FIG. 16) while pivoting upon a hinge 168 as a chain 170, cable, or other structure connected to a power source, such as a motor, pulley, or hydraulic piston, is extended or retracted. Likewise, the bag support structure 136 may be raised and lowered when powered by a hydraulic cylinder, piston 172, or similar structure. The extension and retraction of the bag support structure 136 and retaining lip 166 may share the same or coordinated mechanism(s) such that both extend and retract simultaneously under the influence of a shared or coordinated structure(s). For example, the chain 170 may extend to cause the bag support structure 136 to drop to its lowest level. When the bag support structure 136 rests upon the ground or other inferior structure, the chain 170 may continue to extend causing the retaining lip 166 to relax and drop into open position. Conversely, the hydraulic piston 172 may retract, causing the chain 170 to retract. As the chain 170 retracts, the retaining lip 166 is pulled up into closed position until it reaches, e.g., a ninety degree angle with the plane of the bag support structure 136. The hinge 168 may then prevent further rotation of the retaining lip 166 which remains locked into position with the bag support structure 136. The chain 170 may then continue to retract, causing the bag support structure to retract towards the piston 172. In another embodiment, the chain 170 retracts and/or extends the hinge 168 while the hydraulic piston 172 retracts and/or extends the bag support structure 136.

Figure 18:
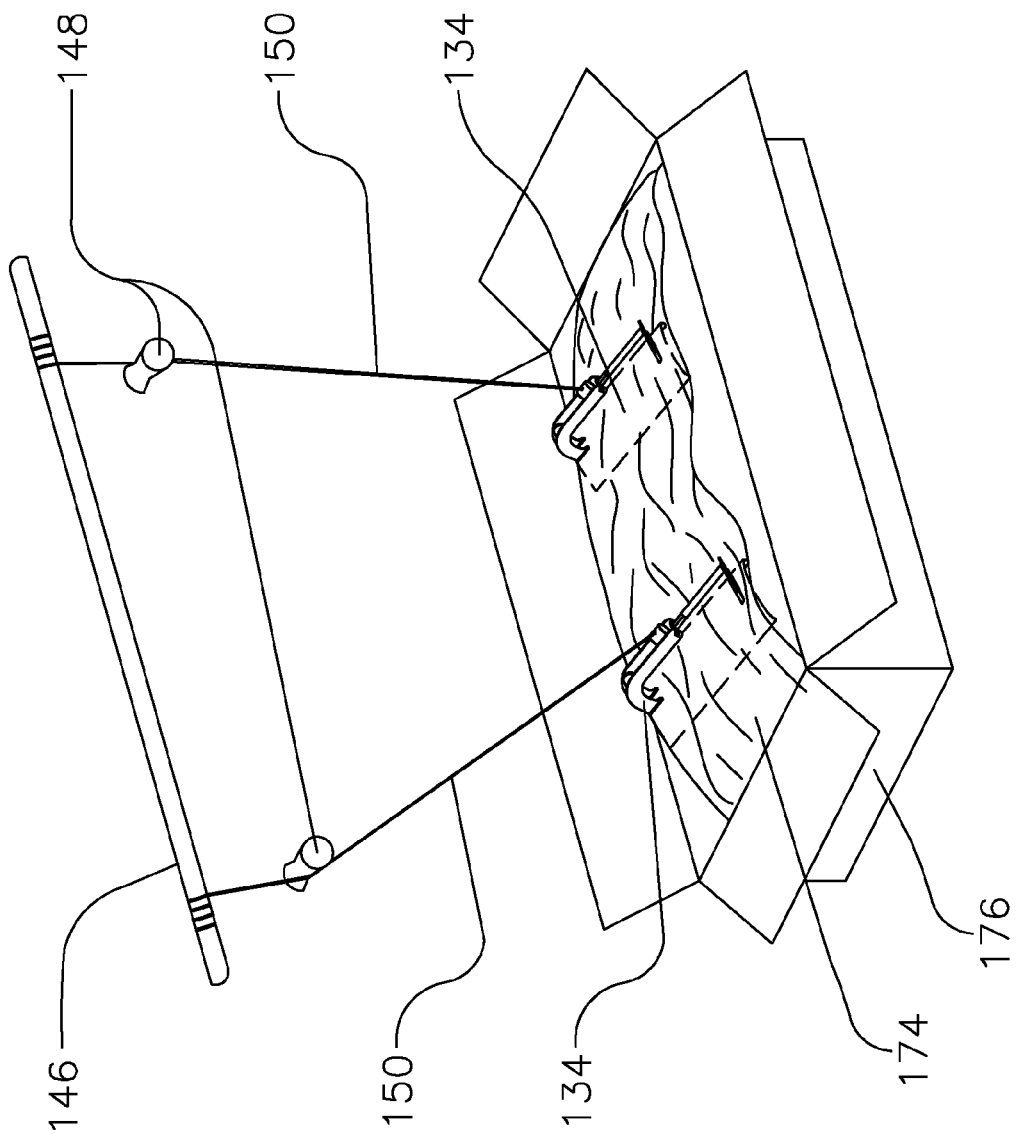
FIG. 18 is a perspective rear view of a bag installation system and bag during installation.

Referring specifically to FIG. 18, and generally to FIGS. 10 through 17, a method of installing a bag on a bagging machine is described. The winch 146 unwinds as cables 150 unravel away from the winch 146, allowing attachments 134 to reach a bag 174 within a box 176. The attachments 134 are slipped into position around the pre-folded upper portion of the bag 174. Attachments are small enough to easily fit around the upper portion of the bag 174 yet large and strong enough to bear the weight of the bag 174 during bagging machine operation and bag deployment. The small, portable nature of the attachments 134 is a significant improvement upon prior systems, such as bag cradles, that require operators to lift the top portion of the bag and place it upon the cradle. Since some bags can be very heavy, e.g., 1200 pounds, requiring operators to lift or manipulate the bag without the leverage, power, or assistance of machinery is inconvenient, awkward, and often unsafe.

After the bag attachments 134 are attached to the bag 174, the winch 146 winds the cables 150 towards the winch 146, the cable guides 148 spread the cables 150, attachments 134, and top bag portion. The tunnel 24 is preferably retracted to its narrowest position to permit the opening of the bag 174 to fit over and around the tunnel 24 as the bag 174 is raised off of the ground towards the support structure 130. The angled wedge 164 and retainer portion 156 on the attachments 134 hold the bag 174 from falling off during installation and from premature deployment during operation of the bagging machine and filling or packing of the bag 174.

As the bag 174 is lifted from the ground and later moved from the rear end 144 of the support structure 130 towards the front end 142 of the support structure, the bottom portion of the bag 174 drags upon the ground towards the direction of the bag support structure 136. The bag support structure 136 and retaining lip 166 are lowered and moved towards toward the bag 174, e.g., approximately two feet. An operator may then slide the bottom portion of the bag 174 onto the bag support structure 136, and the bag support structure 136 and retaining lip 166 are retracted into closed position. The frame 132 is also moved to its forward-most position on the support 130. The bag 174 is then fully installed around the tunnel 24 and prepared for deployment to be filled by material from the tunnel 24 during operation of the bagging machine 10.

The claimed invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

I claim:

1. A support structure of a material bagging assembly, comprising:
    front and rear ends;
    a bag support and retraction structure fixedly connected to and extending from the rear end, having two or more bag attachments suspended below the bag support and retraction structure and at least one cable secured to the bag support and retraction structure and the two or more bag attachments; wherein the two or more bag attachments each comprise:
        a carry portion on which a top portion of a bag may rest;
        a retainer portion that is mounted to the carry portion, the retainer portion further comprises: a shaft connected to the carry portion with a hinge, the shaft having a wedge at an end opposite the hinge; and
        a cable termination;
    and wherein the two or more bag attachments remain substantially suspended below the bag support and retraction structure during bagging.

2. The support structure of claim 1, wherein the bag support and retraction structure further comprises:
    a movable frame;
    two, parallel rails on which the moveable frame may rest; and
    at least one brace.

3. The support structure of claim 2, wherein the movable frame moves between the two rails along the length of the support structure.

4. The support structure of claim 3, wherein the bag support and retraction structure includes a winch shaft mounted to the movable frame.

5. The support structure of claim 4, wherein the at least one cable includes first and second cables, wherein the winch shaft includes first and second ends, wherein the first cable is attached to the first end of the winch shaft and the second cable is attached to the second end of the winch shaft.

6. The support structure of claim 5, wherein the first cable is attached to a first bag attachment, and the second cable is attached to a second bag attachment.

7. The support structure of claim 6, further comprising first and second cable guides, wherein the first and second cable guides direct the first and second cables away from each other, and wherein the first and second cable guides direct the first and second bag attachments away from each other.

8. A bag installation system for a bagging machine, the system comprising:
the support structure of claim 1; and
a movable frame configured to carry a bag from a first position upon the support structure to a second position upon the support structure.

9. A bagging machine, the machine comprising:
a material packing tunnel; and
the support structure of claim 1 for connecting a bag to the material packing tunnel.

10. A bag attachment system for a bagging machine, the system comprising a support structure of claim 1.

11. A bag installation system for a bagging machine, the system comprising a support structure of claim 1.

12. A bagging machine comprising a support structure of claim 1.

13. A bagging machine comprising a support structure of claim 2.

14. A bagging machine comprising a support structure of claim 3.

15. A bagging machine comprising a support structure of claim 4.

16. A bagging machine comprising a support structure of claim 5.

17. A bagging machine comprising a support structure of claim 6.

18. A bagging machine comprising a support structure of claim 7.

* * * * *